United States Patent
Beslic et al.

(10) Patent No.: US 8,972,502 B2
(45) Date of Patent: *Mar. 3, 2015

(54) APPARATUS AND METHOD FOR MANAGING USER CHAT EXPERIENCES WITH BUSINESSES

(71) Applicant: Getabl Inc., Boston, MA (US)

(72) Inventors: Milenko Beslic, Brookline, MA (US); Mark Slater, Boston, MA (US)

(73) Assignee: Getabl Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,023

(22) Filed: Oct. 1, 2013

(65) Prior Publication Data

US 2014/0189025 A1 Jul. 3, 2014

Related U.S. Application Data

(63) Continuation of application No. 13/434,512, filed on Mar. 29, 2012, now abandoned.

(51) Int. Cl.
| | |
|---|---|
| *G06F 15/16* | (2006.01) |
| *G06Q 99/00* | (2006.01) |
| *G06Q 30/00* | (2012.01) |
| *G06Q 10/10* | (2012.01) |
| *H04L 12/58* | (2006.01) |
| *G06Q 30/02* | (2012.01) |

(Continued)

(52) U.S. Cl.
CPC ............. *G06Q 10/107* (2013.01); *H04L 51/046* (2013.01); *G06Q 30/0281* (2013.01); *H04N 21/4788* (2013.01); *H04L 12/1813* (2013.01)
USPC ............................. 709/204; 705/319; 705/346

(58) Field of Classification Search
CPC ....... H04L 51/04; H04L 51/043; H04L 5/046; H04L 67/24; H04L 67/20; H04L 67/16; G06Q 30/0281
USPC ................................... 709/204; 705/319, 346
See application file for complete search history.

(56) References Cited

U.S. PATENT DOCUMENTS

| | | | | |
|---|---|---|---|---|
| 7,263,526 | B1 * | 8/2007 | Busey et al. | .......................... 1/1 |
| 7,305,350 | B1 | 12/2007 | Bruecken | .......................... 705/1 |
| 7,379,087 | B2 | 5/2008 | Yamatari et al. | ........... 348/14.09 |

(Continued)

OTHER PUBLICATIONS

ISA/US Commissioner of Patents, International Search Report and Written Opinion for PCT/US2013/34598, mailed Oct. 9, 2014, 9 pages.

*Primary Examiner* — Aaron Strange

(74) *Attorney, Agent, or Firm* — Sunstein Kann Murphy & Timbers LLP

(57) ABSTRACT

A computer-implemented method of managing a chat experience of a user desiring to chat with a selected one of a plurality of businesses utilizes in various aspects a chat management server running computer processes for communicating with user devices. In another aspect, a computer-implemented method of providing a chat experience to a user having a user device and desiring to chat with a selected one of a plurality of businesses utilizes computer processes running on the user device. Corresponding embodiments similarly provide an apparatus performing any of the foregoing methods. Other corresponding embodiments similarly provide a computer readable medium storing instructions, which when loaded into a computer, perform processes corresponding to any of the foregoing methods.

47 Claims, 33 Drawing Sheets

(51) Int. Cl.
*H04N 21/4788* (2011.01)
*H04L 12/18* (2006.01)

(56) References Cited

U.S. PATENT DOCUMENTS

| | | | |
|---|---|---|---|
| 7,861,176 B2 | 12/2010 | Weisberg | 715/758 |
| 8,271,509 B2 | 9/2012 | Dauginas et al. | 707/758 |
| 8,335,495 B1 | 12/2012 | Haleem et al. | 455/414.2 |
| 8,335,825 B2 | 12/2012 | Glasgow | 709/206 |
| 2001/0032244 A1 | 10/2001 | Neustel | 709/206 |
| 2001/0054064 A1 | 12/2001 | Kannan | 709/203 |
| 2003/0037110 A1 | 2/2003 | Yamamoto | 709/204 |
| 2007/0186172 A1* | 8/2007 | Sego et al. | 715/753 |
| 2009/0234926 A1 | 9/2009 | Stern et al. | 709/206 |
| 2010/0076837 A1* | 3/2010 | Hayes et al. | 705/14.41 |
| 2012/0036245 A1 | 2/2012 | Dare et al. | 709/223 |
| 2012/0072440 A1* | 3/2012 | Vasquez et al. | 707/769 |
| 2013/0332537 A1* | 12/2013 | Emerick et al. | 709/206 |

* cited by examiner

APPARATUS AND METHOD FOR MANAGING USER CHAT EXPERIENCES WITH BUSINESSES

RELATED APPLICATIONS

The present application claims priority to and is a continuation application of U.S. application Ser. No. 13/434,512, entitled "Apparatus and Method for Managing User Chat Experiences with Businesses" and filed Mar. 29, 2012, which is hereby incorporated by reference in its entirety.

TECHNICAL FIELD

The present invention relates to electronic messaging, and more particularly to apparatus and methods for managing user chat experiences with businesses.

BACKGROUND ART

It is known in the prior art to make a chat session available to a user having a computer open to a web page of a company so that the user may contact the company about its goods or services. See for example, U.S. Pat. No. 7,861,176. Other kinds of chat servers host video chat and location-based chat among individual users. See for example, U.S. Pat. No. 7,379,087 and published application number 2003/0037110.

SUMMARY OF THE EMBODIMENTS

In a first embodiment of the invention there is provided a computer-implemented method of managing a chat experience of a user desiring to chat with a selected one of a plurality of businesses. the method utilizes a chat management server running computer processes, and these processes include:
- receiving a search signal over a first network from a device, under control of the user, to indicate that the user device is running a process configured to support a managed chat session and including data characterizing criteria for a business with which the user seeks to chat;
- responsive to the search signal, identifying a set of businesses meeting the criteria, determining availability status data for each business in the set of businesses, and transmitting, to the device, availability status data for the set of businesses for display on the user's device;
- receiving over the first network a request message originated by the user on the device to enter a chat channel established for a selected one of the set of businesses; and
- responsive to the request message, subscribing the user device to the chat channel for the selected one of the set of businesses, and transmitting to the device, over the first network, a launch-chat command.

In a related embodiment, the computer processes further include associating a duration for the channel, and if the chat channel has not been previously closed by a party to the chat, then closing the chat channel effective as of the end of the duration. Optionally, the duration is established according to a user-specified default.

In another related embodiment, the request message originated by the user on the device to enter the chat channel has been issued responsive to a user selection, made graphically on a display of the device, of the set of businesses. Optionally, the data characterizing criteria for a business with which the user seeks to chat have resulted from a search initiated by the user. As a further option, the search has resulted by user selection of one of a set of pre-defined categories. Alternatively, the data characterizing criteria for a business with which the user seeks to chat have resulted from selection by the user to cause display of favorites saved by the user. Also alternatively, the data characterizing criteria for a business with which the user seeks to chat have resulted from selection by the user to cause display of businesses recently accessed by the user for purposes of chat.

In another related embodiment, the computer processes further include, responsive to the request message, determining a pattern, for the chat channel, for message routing to seats of the selected business based on availability status data for the selected business and business rules provided by the selected business. Optionally, the pattern includes routing all messages from the user to the same seat. Optionally, the pattern includes routing successive messages from the user to the next available seat that is not busy. Optionally, the pattern includes routing all messages from the user to a plurality of seats simultaneously. In a further related embodiment, (i) business rules provided by the selected business specify a plurality of seat types, (ii) the availability data includes information enabling a user to make a selection corresponding to a specific seat type, (iii) the request message includes data indicative of the seat type corresponding to the selection made by the user, and (iv) subscribing the user device to the chat channel includes subscribing the user device in a manner consistent with the specific seat type.

In another related embodiment, the computer processes further include receiving, in the search signal, data indicating an approximate location of the device and transmitting availability data includes transmitting availability data for businesses based, at least in part, on the approximate location.

In another related embodiment, the computer processes further include storing chat content of the chat channel and archiving the content in a chat database in association with an identifier for the selected business and for the user. Optionally, the computer processes further include storing, in the chat database, chat metadata with the chat content. Optionally, the computer processes further include storing, in the chat database, data relating to an unsuccessful attempt by the user to initiate chat with one of the plurality of businesses. Optionally, the computer processes further include running a computerized analysis of the chat database, to identify chat performance measurements, for any given business, including at least one of: (a) what fraction of user requests to chat were followed by a response; (b) average time to first response per request; (c) average time to response, after the first response, per request; (d) average number of responses provided in a given chat session; and (e) what percentage of chat responses were made within a specified period of time.

In another related embodiment, identifying the set of businesses meeting the criteria includes determining from stored data whether the user is authorized by any given business meeting the criteria, and if so including the given business in the set of businesses and otherwise excluding the given business from the set of businesses.

In another related embodiment, the computer processes further include, prior to subscribing the user device to the chat channel for the selected one of the set of businesses, determining whether the selected one of the set of businesses requires further authorization by the business to enable the user to chat, and, if so, (i) transmitting to the device, over the first network, data establishing a form to be displayed on the device, configured to receive user-supplied information establishing entitlement of the user to chat, (ii) receiving from the device such information, (iii) processing such information, and only if authorization is determined as a result of such information, allowing the subscribing of the user device to the chat channel.

In another related embodiment, the computer processes further include prior to receiving a search signal, receiving over the first network from the user's device a request and credentials for authentication of the user, determining if the credentials are valid, and if so, logging in the user device. Optionally, the user has at least one additional device, and the method further includes:

receiving over a second network from the at least one additional device a further request and further credentials for authentication of the user, determining if the further credentials are valid, and if so, logging in the at least one additional user device; and subscribing the at least one additional device to the chat channel.

Optionally, the computer processes further include repeating each of the foregoing processes at least once so as to subscribe the user device to at least one additional chat channel for another business selected by the user, so that the user device may be simultaneously subscribed to a plurality of chat channels. Optionally, when the user has at least one additional device, the method further includes receiving over a second network from the at least one additional device a further request and further credentials for authentication of the user, determining if the further credentials are valid, and if so, logging in the at least one additional user device; and subscribing the at least one additional device to the plurality of chat channels.

In another related embodiment, the computer processes further include receiving a forward-chat message from the user over the first network; and responsive to the forward-chat message, forwarding to the user at a secondary electronic destination, in accordance with user-established settings, chat messages addressed to the user from the selected one of the set of businesses and forwarding to the selected one of the set of businesses each message from the user originating from the secondary electronic destination in response to a forwarded message from the selected one of the set of businesses. Optionally, the user-established settings specify forwarding to occur at all times when forwarding is in effect. Alternatively, the user-established settings specify forwarding to occur only when the user device is not in communication with the server.

In another related embodiment, the computer processes further include, upon subscribing the user device to the chat channel, identifying the user in accordance with criteria established by the user. Optionally, the criteria are global and apply to all businesses with which the user engages in chat. Alternatively, the criteria are specified by the user as applicable to the selected one of the businesses.

In yet another related embodiment, the computer processes further include receiving from a business user, in one of the seats, of the selected business, that is subscribed to the chat channel, a transfer request message to transfer the user to chat with a different seat of the selected business; and responsive to the transfer request message, transferring the user device to chat with the different seat of the selected business. Alternatively, the computer processes further include receiving from a business user, in one of the seats, of the selected business, that is subscribed to the chat channel, a join request message to add to the chat channel at least one additional business user from the selected business; and responsive to the join request message, subscribing to the chat channel the at least one additional business user.

In another related embodiment, the computer processes further include running an installed application of the selected business, in accordance with business rules specified by the selected business, after the user has been subscribed to the chat channel. Optionally, running the installed application occurs automatically immediately after the user has been subscribed to the chat channel. Alternatively, running the installed application occurs when a business user of the selected business manually invokes the installed application. Alternatively, running the installed application occurs when triggered automatically by a response by the user in the course of chat.

In another embodiment of the present invention there is provided a computer-implemented method of managing a chat experience of a business user desiring to chat with a selected one of a plurality of other users. the method utilizes a chat management server running computer processes that include:

receiving a search signal over a first network from a device, under control of the business user, to indicate that the user device is running a process configured to support a managed chat session and including data characterizing criteria for another user with whom the business user seeks to chat;

responsive to the search signal, identifying a set of users meeting the criteria, and for each user in the set of users, determining availability status, and transmitting, to the device, availability status data for the set of users for display on the business user's device;

receiving over the first network a request message originated by the business user on the device to enter a chat channel established for a selected one of the set of users; and responsive to the request message, subscribing the user device to the chat channel for the selected one of the set of users, and transmitting to the device, over the first network, a launch-chat command.

In a related embodiment, identifying the set of users meeting the criteria includes excluding from the set any user who has not authorized receiving chat from the business of the business user, so that such user is not displayed on the business user's device. In a further related embodiment, of managing a chat experience of a given business user desiring to chat with a selected one of a plurality of other business users in the same business as the given business user, the set of users corresponds to at least some of other business users in the same business. Optionally, the data characterizing criteria for another user with whom the business user seeks to chat have resulted from a search initiated by the business user. Optionally, the search has resulted by business user selection of one of a set of pre-defined categories. Alternatively, the data characterizing criteria for a another user with whom the business user seeks to chat have resulted from selection by the business user to cause display of favorites saved by the business user. Alternatively, the data characterizing criteria for a another user with whom the business user seeks to chat have resulted from selection by the business user to cause display of users recently accessed by the business user for purposes of chat.

In a further related embodiment, the computer processes further include associating a duration for the channel, and if the chat channel has not been previously closed by a party to the chat, then closing the chat channel effective as of the end of the duration.

In a further related embodiment, the computer processes further include prior to receiving a search signal, receiving over the first network from the business user's device a request and credentials for authentication of the business user, determining if the credentials are valid, and if so, logging in the business user device. In a further related embodiment, the business user has at least one additional device, and the method further includes receiving over a second network from the at least one additional device a further request and further credentials for authentication of the business user, determining if the further credentials are valid, and if so, logging in the at least one additional device; and subscribing the at least one additional device to the chat channel. As a further option the computer processes further include repeating each of the foregoing processes at least once so as to subscribe the business user device to at least one additional chat channel for another user selected by the business user, so that the business user device may be simultaneously subscribed to a plurality of chat channels.

In a further related embodiment, the user has at least one additional device, and the method further includes receiving over a second network from the at least one additional device a further request and further credentials for authentication of the business user, determining if the further credentials are valid, and if so, logging in the at least one additional business user device; and subscribing the at least one additional device to the plurality of chat channels.

Corresponding embodiments similarly provide an apparatus performing any of the foregoing methods. Other corresponding embodiments similarly provide a computer readable medium storing instructions, which when loaded into a computer, perform processes corresponding to any of the foregoing methods.

In another embodiment, the invention provides a computer-implemented method of providing a chat experience to a user having a user device and desiring to chat with a selected one of a plurality of businesses. In this embodiment, the method utilizes computer processes running on the user device. The processes include:

transmitting to a chat management server a search signal, over a first network, to indicate that the user device is running a process configured to support a managed chat session and including data characterizing criteria for a business with which the user seeks to chat;

receiving, from the chat management server, over the first network, responsive to the search signal, availability status data for each business in a set of businesses meeting the criteria;

displaying the availability status data on the user's device;

responsive to a user selection of one of the set of businesses, transmitting over the first network, to the chat management server, a request message to enter a chat channel established for the selected one of the set of businesses;

receiving from the chat management server, over the first network, responsive to the request message, a launch-chat command, indicating that the user device has been subscribed to a chat channel for the selected one of the set of businesses, and transmitting to the device, over the first network; and responsive to the launch-chat command, opening a chat display box on the user device to receive chat initiated by the user that is directed to the selected business.

In another embodiment, the invention provides a non-transitory computer readable medium encoded with instructions which, when loaded into a user device, establish processes for providing a chat experience to a user having the user device and desiring to chat with a selected one of a plurality of businesses. The processes include:

transmitting to a chat management server a search signal, over a first network, to indicate that the user device is running a process configured to support a managed chat session and including data characterizing criteria for a business with which the user seeks to chat;

receiving, from the chat management server, over the first network, responsive to the search signal, availability status data for each business in a set of businesses meeting the criteria;

displaying the availability status data on the user's device;

responsive to a user selection of one of the set of businesses, transmitting over the first network, to the chat management server, a request message to enter a chat channel established for the selected one of the set of businesses;

receiving from the chat management server, over the first network, responsive to the request message, a launch-chat command, indicating that the user device has been subscribed to a chat channel for the selected one of the set of businesses, and transmitting to the device, over the first network; and responsive to the launch-chat command, opening a chat display box on the user device to receive chat initiated by the user that is directed to the selected business.

BRIEF DESCRIPTION OF THE DRAWINGS

The foregoing features of embodiments will be more readily understood by reference to the following detailed description, taken with reference to the accompanying drawings, in which:

FIG. 21 is a representation of a computer screen presented to the user of FIG. 20 who has selected to launch chat with one of the businesses identified in FIG. 20;

FIG. 28 is a representation of a computer screen presented to the business user of FIGS. 24-27 after completing a validation process;

FIG. 32A is a representation of a first part computer screen presented to the business user of FIGS. 24-31 showing the user's business settings;

FIG. 32B is a representation of a second part computer screen presented to the business user of FIGS. 24-31 showing the user's business settings;

DETAILED DESCRIPTION OF SPECIFIC EMBODIMENTS

Definitions

Figure 1:
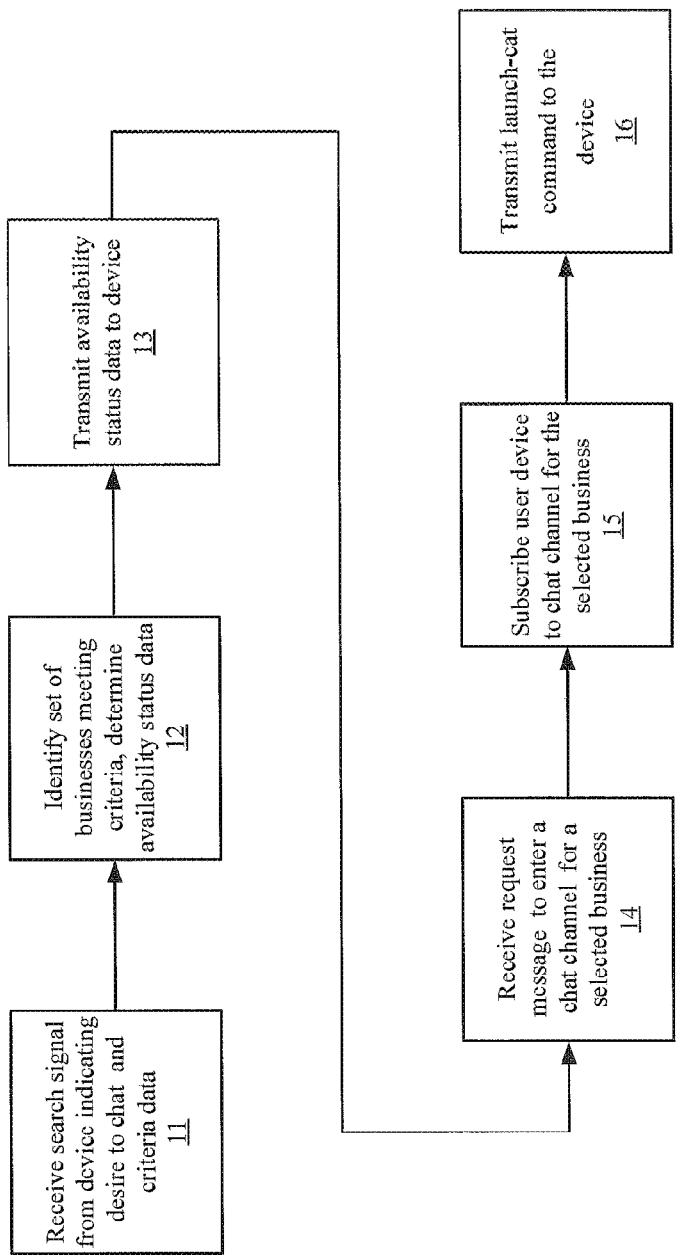
FIG. 1 is a block diagram of processes implemented to subscribe a user to a chat channel with a business in accordance with an embodiment of the present invention.

As used in this description and the accompanying claims, the following terms shall have the meanings indicated, unless the context otherwise requires:

"Chat" means asynchronous interactive digital communication between two endpoints using at least one of text, video, voice, audio, and data files.

"Availability status data" means whether a chat channel has been opened for the business and optionally a rating of the responsiveness of the business, and optionally taking into account business rules established by the business. Availability status data may indicate status options including at least a plurality of the following: "away", "off", "busy", "online", and "open to receive messages even though not available for immediate chat". Two parties to chat need not necessarily be online simultaneously in order for a chat channel to be opened for the parties.

A "user" is an individual who has an account with a system in accordance with an embodiment hereof for managing chat.

A "business user" is a "user" as defined herein who is registered as a user affiliated with a "claimed business".

A "claimed business" is a business that has at least one "business user".

"Chat channel" refers to the specific communication path between the user and a business selected by the user for engaging in chat.

A "set" includes at least one member.

A "seat" is a chat node that can be staffed by an individual representing a given business in chat. Accordingly, when a user seeks to chat with a business having a plurality of seats, it is possible for the chat management server to subscribe the user to chat with a seat of the business that is not currently engaged in chat (or which currently has sufficient capacity to engage in chat) with the user (assuming of course that the seat is being occupied by an individual representing the business in chat).

A seat is "busy" if the number of concurrent chat channels associated with the seat reaches a pre-specified threshold.

A seat is occupied by an individual representing the business herein called a "seat operator".

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "user device" is a computer that is used by a user and implemented as a desktop unit, a laptop unit, a tablet, a smartphone, or as any other computer having access to a network.

A "search signal" is a signal originating from a user device to indicate that the user device is running a process configured to support a chat session managed in accordance with embodiments described herein and it includes data characterizing criteria for a business with which the user seeks to chat.

When a device of a particular user is "logged in", the device is authorized by the chat management server to send communications from, and receive communications to, the particular user.

An "installed application" is an application, provided by a claimed business, that is configured to run, under conditions established by the business, after a user has been subscribed to a chat channel in order to provide to provide communication functionality, between the business and the user, that is enhanced in comparison to simple chat. The application may be stored on the chat management server or on a server of the business.

"Business administrator" is a role assigned to a business user affiliated with a claimed business in which the business user is empowered by the chat management server to configure chat management settings pertinent to the claimed business.

"Location administrator" is a role assigned to a business user affiliated with a claimed business, as to a specific location of the claimed business, in which the business user is empowered by the chat management server to configure chat management settings pertinent to the claimed business solely with respect to the specific location.

"Business operator" is a role assigned to a business user affiliated with a claimed business in which the business user is not empowered by the chat management server to configure chat management settings for any other business user.

"Chat metadata" is data characterizing chat activity on the chat management server other than the specific content of the chat itself.

"RESTful" a set of architectural principles that govern operation of an application programming interface (API) for the chat management server described herein. These principles define structures that pertain to communication between clients and servers and are applicable, among other things, to how resource states are addressed and transferred over HTTP by a wide range of clients written in different languages.

FIG. 1 is a block diagram of processes implemented to subscribe a user to a chat channel with a business in accordance with an embodiment of the present invention. The processes are carried out on a chat management server. In process 11, the server receives a search signal over a first network from a device, under control of the user, to indicate that the user device is running a process configured to support a managed chat session. The search signal includes data characterizing criteria for a business with which the user seeks to chat.

In process 12 of FIG. 1, responsive to the search signal, the server identifies a set of businesses meeting the criteria, and for each business in the set of businesses, the server determines availability status data for each location. In process 13, the server transmits, to the device, availability status data for the set of businesses for display on the user's device. In process 14 of FIG. 1, the server receives over the first network a request message originated by the user on the device to enter a chat channel established for a selected one of the set of businesses. In process 15, responsive to the request message, the server subscribes the user device to the chat channel for the selected one of the set of businesses, and in process 16, the server transmits to the device, over the first network, a launch-chat command.

As we show in further detail below, although the processes have been described in connection with a single business with which the user of the device wishes to chat, embodiments herein support chatting of the user with a plurality of businesses. Also, although the processes have been described in connection with a single user device, embodiments herein support making chat history, and further chat, available to the user simultaneously on a plurality of devices. Of course, the processes illustrated with respect to a given user can be replicated with any number of other users who would use their own devices for engaging in chat with businesses of their own selection.

Figure 2:
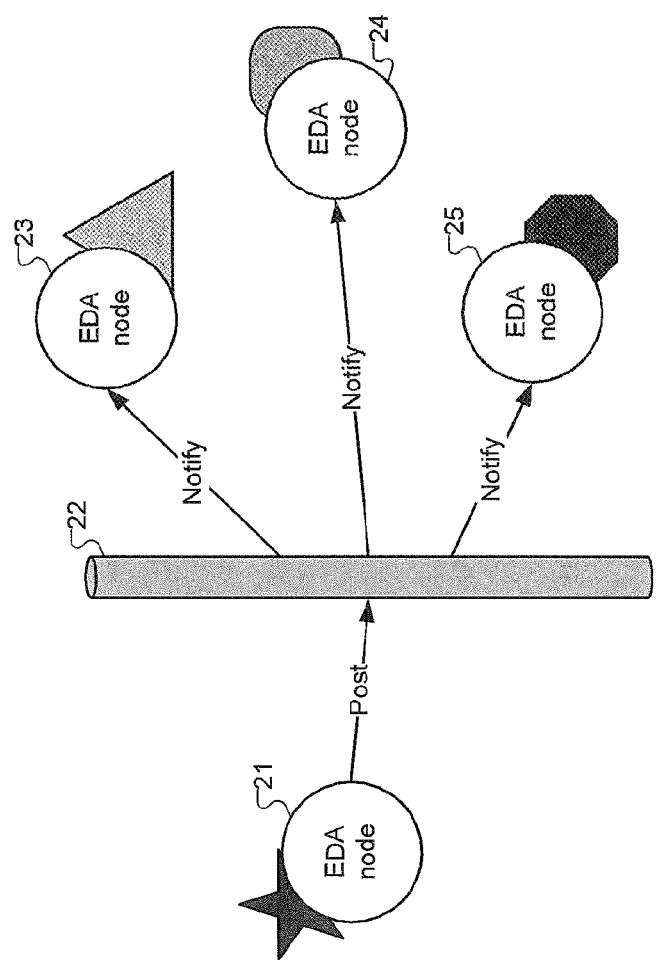
FIG. 2 is a schematic representation of event-driven architecture as implemented in embodiments of the present invention to provide asynchronous communication in chat sessions.

FIG. 2 is a schematic representation of event-driven architecture as implemented in embodiments of the present invention to provide asynchronous communication in chat sessions. Item 21 is a typical device of a user that makes a message post to the chat management server 22. The device 21 is subscribed to the same chat channel as the devices 23, 24, and 25 of other users. On receiving the message post from device 21, the server notifies the other devices subscribed to the same chat channel of the message, and so sends the notification to devices 23, 24, and 25. The event-driven architecture employed herein has the benefit of simplicity and scalability, while eliminate needless traffic associated with polling and other techniques used in the absence of event-driven architecture.

Figure 3:
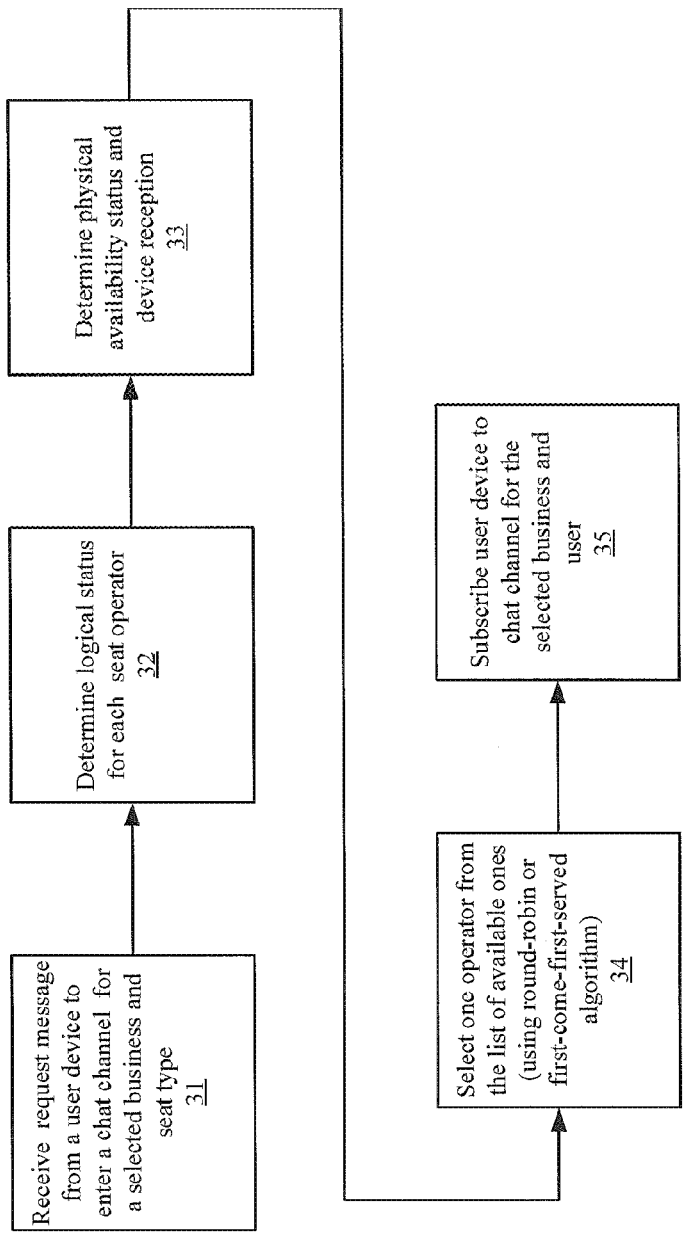
FIG. 3 is a block diagram of processes implemented in accordance with an embodiment of the present invention to assign a user device to a chat channel for a selected business and seat type.

FIG. 3 is a block diagram of processes implemented in accordance with an embodiment of the present invention to assign a user device to a chat channel for a selected business and seat type. In process 31, the server receives a request message from a user device to enter a chat channel for a selected business and seat type. Before we explain the type of a seat, we point out that a business can engage a plurality of individuals to engage in chat with users. Each individual allocated by the business to engage in chat occupies what we here call a "seat". A seat, more particularly, is a chat node that can be staffed by an individual representing the business in chat. Accordingly, when a user seeks to chat with a business having a plurality of seats, it is possible for the chat management server to subscribe the user to chat with a seat of the business that is not currently engaged in chat (or which currently has sufficient capacity to engage in chat) with the user (assuming of course that the seat is being occupied by an individual representing the business in chat).

In various embodiments of the present invention, when a user seeks to enter into chat with a business, the business may itself have established a structure for handling chat of various different types. For example, the business may assign one set seats to handling chat relating to product returns, another set of seats to handling technical questions concerning product usage, and another set of seats to handle order inquiries. Each set of seats is a different "type" of seat. Embodiments of the present invention therefore accommodate a plurality of seat types that can be assigned and configured by the business (namely, by the "business administrator") according to its own needs. Moreover, the user need not be presented with a monolithic icon representing the entire business for purposes of chat. Instead, the business may choose to have the user experience a different icon for each seat type—in other words, the user may press one icon to chat with the business about a product return, another icon to chat with the business about technical questions concerning product usage, and yet another icon to chat with the business about an order inquiry.

Returning now to FIG. 3, in process 31, the server receives a request message from a user device to enter a chat channel for a selected business and a seat type selected by the user. In process 32, responsive to the request message, the server determines the logical status for each seat operator, that is, determines whether an individual representing the business is currently occupying each seat. In process 33, the server determines physical availability status and device status for the user's device. In process 34, the server selects one operator from a list of available operators, using a suitable algorithm, such as round-robin or first-come-first served. If an operator is available, then in process 35, the server subscribes the user device to a chat channel for the selected business and the user.

Figure 4:
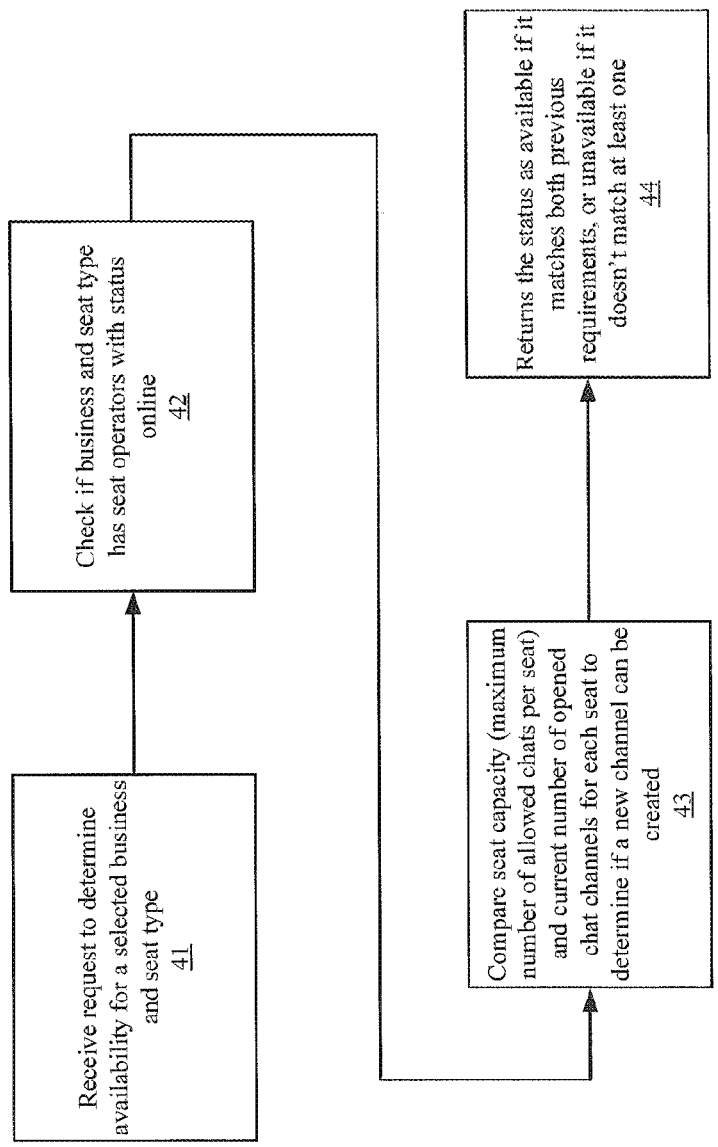
FIG. 4 is a block diagram of processes implemented in accordance with an embodiment of the present invention to establish availability data for a business that can be used as part of availability data supplied to a user device.

FIG. 4 is a block diagram of processes implemented in accordance with an embodiment of the present invention to establish availability data for a business that can be used as part of availability data supplied to a user device. In process 41, the server receives a request message from a user device to determine availability for a selected business and seat type. The logical processes carried out by the chat management server have as a goal to notify the user if a selected business and seat type are available to engage in chat with the user. Accordingly, in process 42, responsive to the request message, the server determines if for the selected business and seat type there is at least one seat operator with status online. In process 43, the server compares seat capacity (maximum number of allowed chats per seat) and current number of opened chat channels for each seat, to determine if a new channel can be created. In process 44, the server returns the status as available only if these criteria are satisfied. In various embodiments of the present invention, even if an operator is not currently available for the selected business, it may still be possible to subscribe the user to a chat channel, because in such a scenario the user's chat message can be forwarded to the business when an operator does become available. Whether the user is subscribed to a chat channel under such a condition, can be the subject of a configuration setting available to the business administrator.

Figure 5:
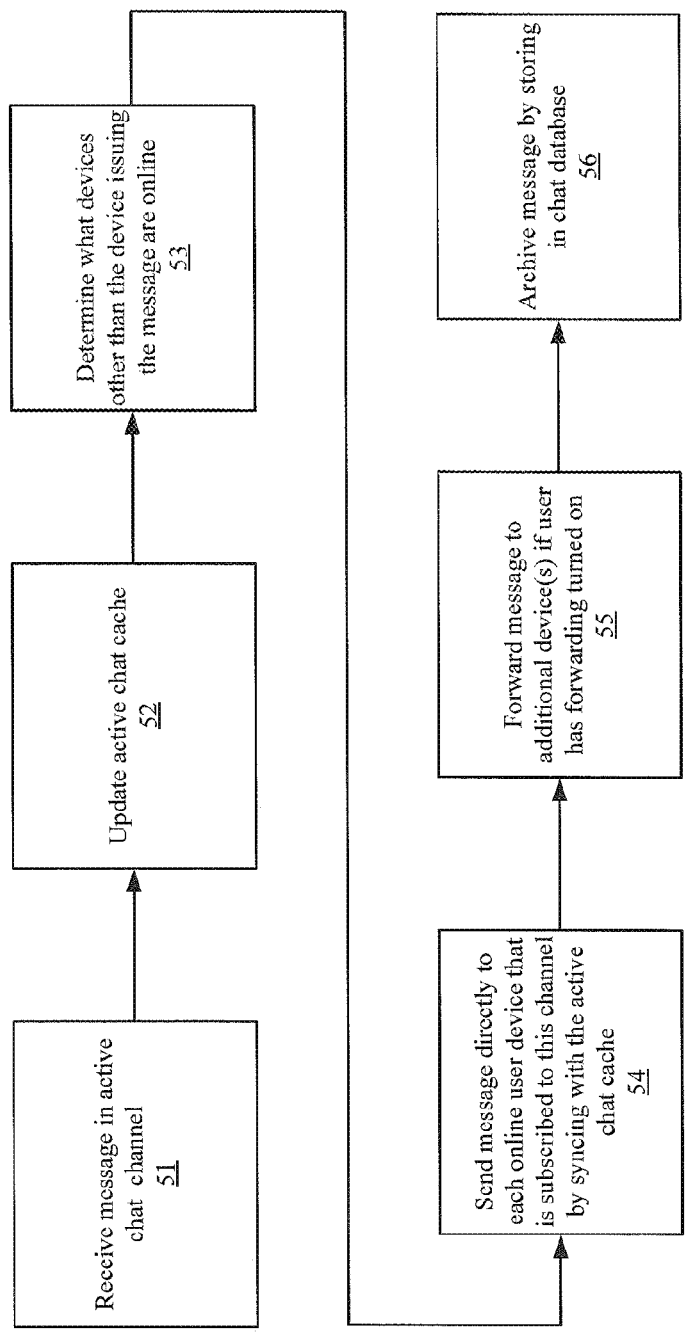
FIG. 5 is a block diagram of processes implemented in accordance with an embodiment of the present invention to provide messaging services over various user devices.

FIG. 5 is a block diagram of processes implemented in accordance with an embodiment of the present invention to provide messaging services over various user devices. In process 51, the server receives a message in an active chat channel from a device of a user who is engaged in chat in the chat channel. In process 52, on receipt of the message, the server updates a cache of the active chat channel; this cache stores on a current basis all messages in the chat. In process 53, the server determines what devices subscribed to the active chat channel, other than the device issuing the message, are online. In process 54, the server sends the message directly to each online user device that is subscribed to this channel (the devices having been identified in process 53) by syncing the user device with the active chat cache. In process 55, if any user has turned on forwarding, then the server forwards the message to any additional devices (determined by settings of the user) for which forwarded has been enabled by such user. In process 56, the server archives the message by storing it in the chat database.

Figure 6:
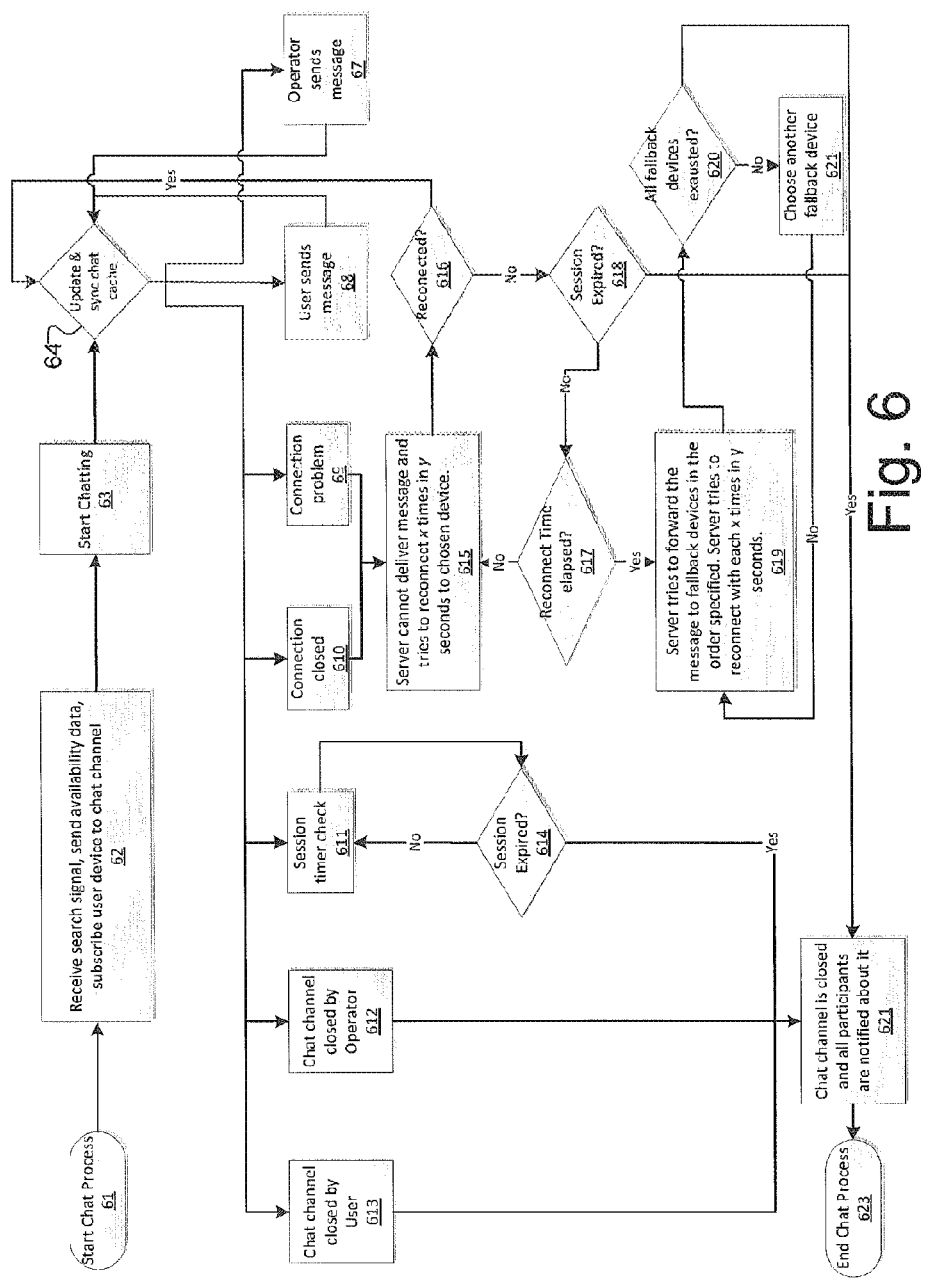
FIG. 6 is a block diagram of processes implemented in accordance with an embodiment of the present invention to monitor and to manage chat sessions.

FIG. 6 is a block diagram of processes implemented in accordance with an embodiment of the present invention to monitor and to manage chat sessions. In process 61, the chat process begins. At the server level, in process 62 (as explained in further detail in connection FIGS. 3 and 4), the chat management server receives the search signal, sends availability data, and subscribes the user device to an active chat channel. In process 63, chatting begins. In process 64 (as explained further detail in connection with FIG. 5), each time a message is sent, the chat cache is updated and it is also synchronized with each online device that is subscribed to the chat channel. Thus the process 64 is invoked when a user sends a message in process 68 or an operator sends a message in process 67. Similarly, process 64 is invoked every time there is a reconnection in process 616 following a disconnection as a result a connection problem in process 69 or connection closure in process 610 (each time identified by unsuccessful message delivery attempts by the server in process 615 or the passage of too much time to reconnect determined in process 617). If the time for reconnecting determined in process 617 has passed, the server will still attempt to perform forwarding in process 619 as discussed above, for example, in connection with process 55 of FIG. 5. The forwarding is performed for all devices specified in settings established by the user. Forwarding is attempted for all fallback devices in the order specified in accordance with processes 619, 620, and 621. If a duration has been established for expiration of the chat channel, then in process 611 a session timer is checked to determine in process 614 whether the session has expired. In the event that it has expired, then in process 621 the chat channel is closed and all participants in the chat are notified by updating the chat cache (as described in connection with process 64) and syncing it one last time with all online devices. Process 621 is also invoked if in process 613 the chat channel is closed by the user or in process 612 the chat channel is closed by the operator.

Figure 7:
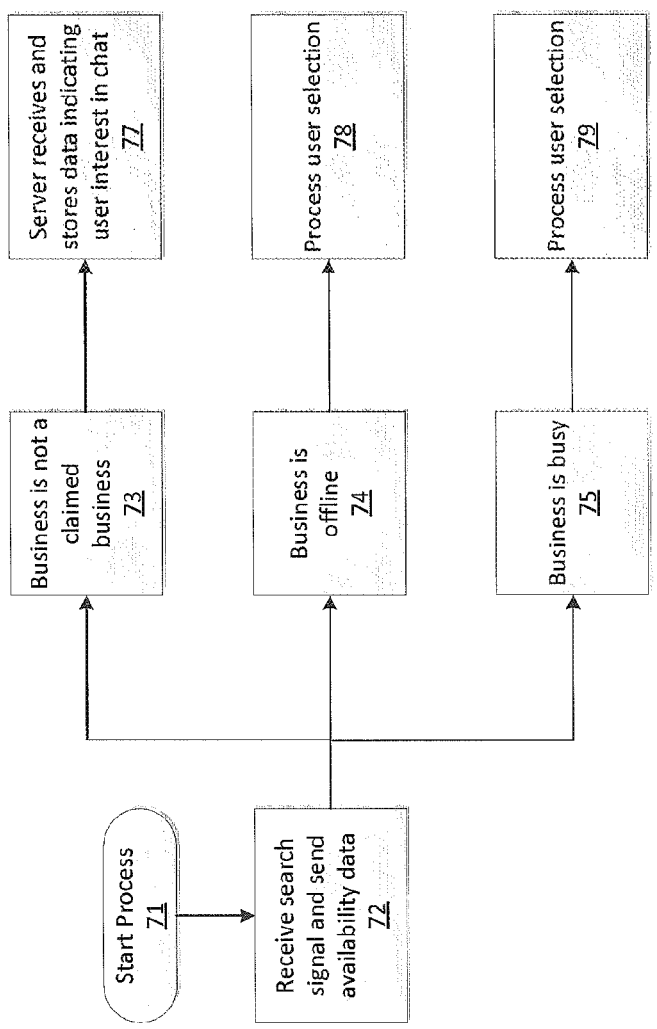
FIG. 7 is a block diagram of processes implemented in accordance with an embodiment of the present invention to handle circumstances when a business is not available to engage in chat at the time when a user seeks a chat session.

FIG. 7 is a block diagram of processes implemented in accordance with an embodiment of the present invention to handle circumstances when a business is not available to engage in chat at the time when a user seeks a chat session. The process starts in item 71. In process 72, the server receives a search signal from the user device and sends availability data in response, all as described in connection with previous figures. We now address cases wherein the selected business in not available to engage at the time the user seeks to chat with the selected business. In one case, in process 73, the selected business is not a claimed business; in this case, the availability data already sent in process 72 has notified the user that the business is not available for chat. Nevertheless, the user may indicate interest in chatting with the business, in which the server receives and stores data indicating user interest in chat in process 77. This data can be used later in contacting the selected business.

In another case in FIG. 7, in process 74, the business is currently offline, and the availability data already sent in process 72 has notified the user that the business is currently offline. Depending on settings established by the business, the user may be given an opportunity to select between either having the user's device currently subscribed to a chat channel or being notified when the business has come back online, and in process 78, the server carries out processes consistent with the user's selection. Similarly, in another case, in process 75, the business is currently busy, and the availability data already sent in process 72 has notified the user that the business is currently busy. Depending on settings established by the business, the user may be given an opportunity to select between either having the user's device currently subscribed to a chat channel or being notified when the business has come back online, and in process 79, the server carries out processes consistent with the user's selection.

Figure 8:
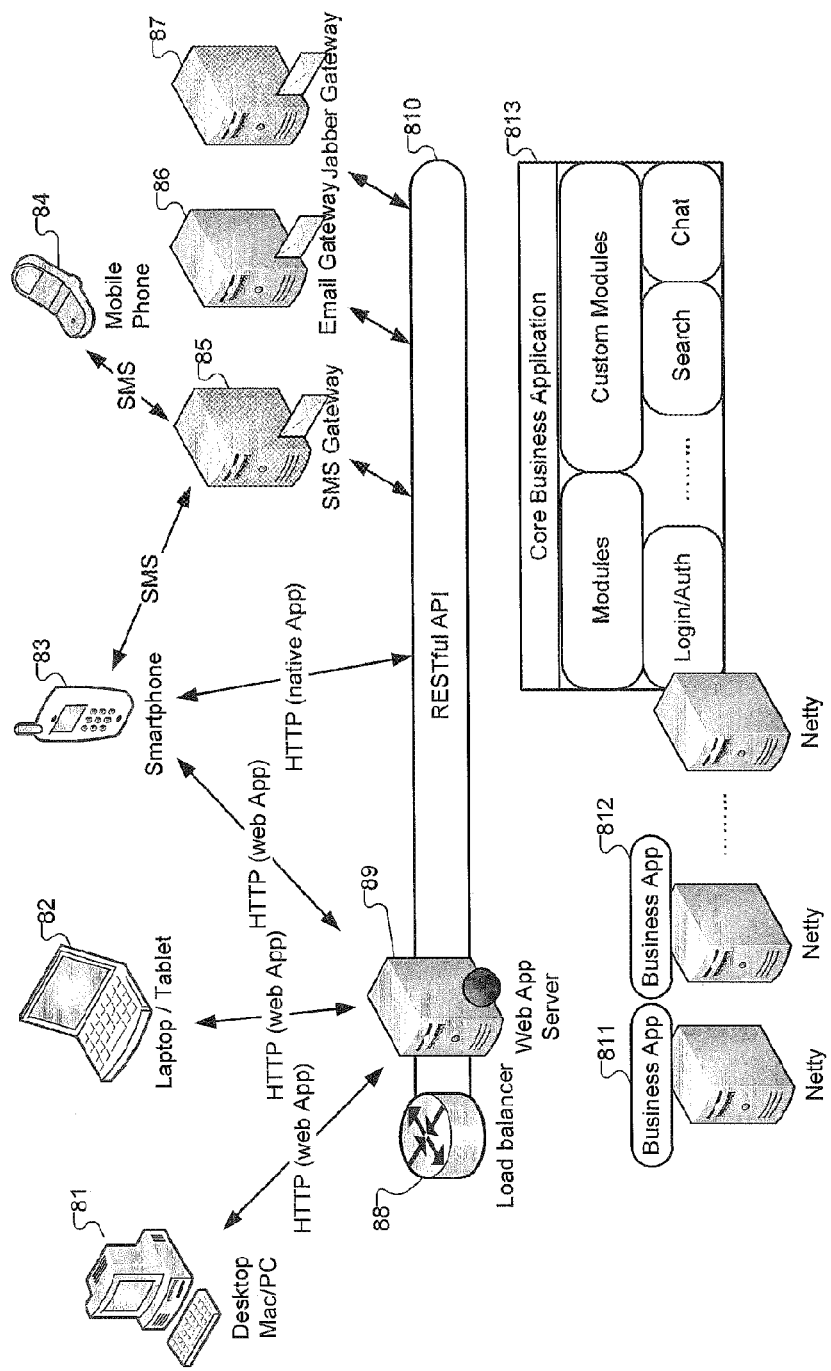
FIG. 8 is a block diagram of architecture of a system for managing user chat experiences with businesses in accordance with an embodiment of the present invention, showing in particular the communication interface with users and businesses.

FIG. 8 is a block diagram of architecture of a system for managing user chat experiences with businesses in accordance with an embodiment of the present invention, showing in particular the communication interface with users and businesses. Item 810 is a common access layer for all user devices, and gateways to other systems. Through the access layer 810 all chat system features are exposed using an API interface that employs a RESTful architecture. Devices, such as desktop computer 81, which may for example, be an Apple MAC computer or a PC computer running Windows 7, laptop or tablet computer 82 or smartphone 83, connect through their web browser applications, using the HTTP protocol, to the web server 89, which in turn communicates with other components of the system through the API 810. Alternatively, the smartphone 83 may run a special application to communicate directly with the API 810. Chat messages can be alternatively delivered to a variety of electronic devices using different network protocols and appropriate gateways. Some examples are the SMS Gateway 85, Email Gateway 86, and Jabber Gateway 87. The Core Business Application 813 contains all business logic and manages communication with external systems (such as the items discussed previously in this paragraph) and internal subsystems (such as Search, discussed in connection with FIG. 9, and Chat, discussed in connection with FIG. 10 below). The Business Application 813 may be replicated across multiple servers (represented as items 811 and 812) to support redundancy and scalability.

Figure 9:
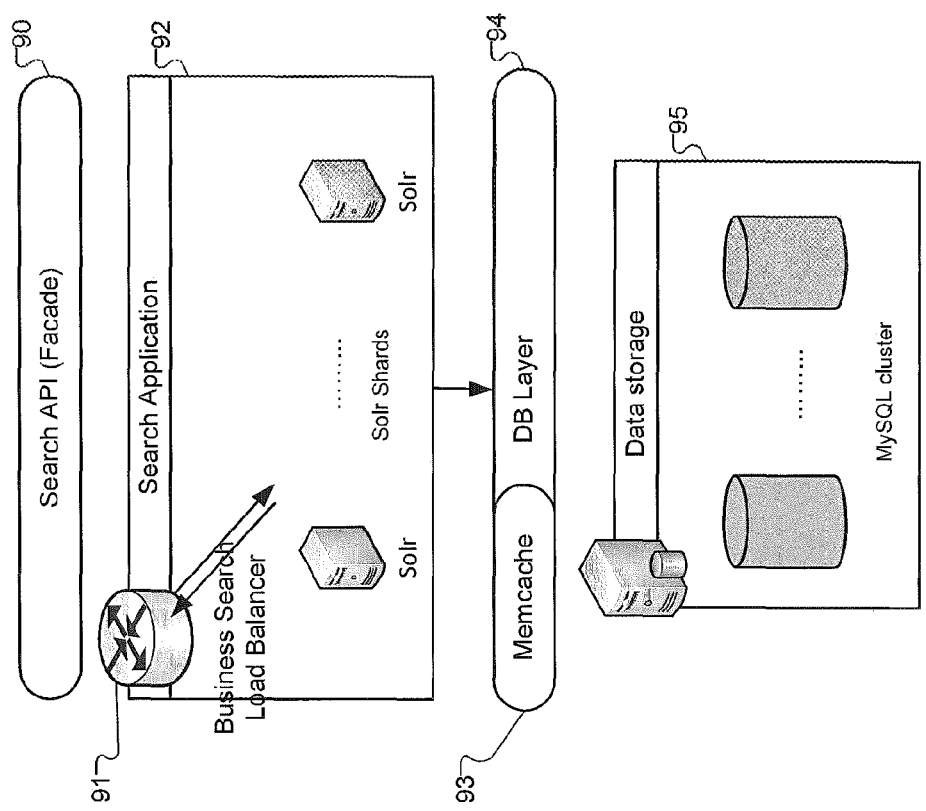
FIG. 9 is a block diagram of architecture of a system for managing user chat experiences with businesses in accordance with an embodiment of the present invention, showing in particular the components implementing business search capability and storage of data relating to users, businesses, chat messages, event logs, and other system information.

FIG. 9 is a block diagram of architecture of a system for managing user chat experiences with businesses in accordance with an embodiment of the present invention, showing in particular the components implementing business search capability and storage of data relating to users, businesses, chat metadata, event logs, and other system information. The Search component provides a common search interface for other components of the system through Search API (Façade) 90. The search logic 92, is implemented using Solr Shards, which is a distributed search application that uses multiple servers for load distribution, scalability and redundancy. Access to data storage is performed through Database layer interface 94 and a caching application (Memcache) 93. Data is distributed across multiple clustered database servers 95 for load distribution, scalability and redundancy.

Figure 10:
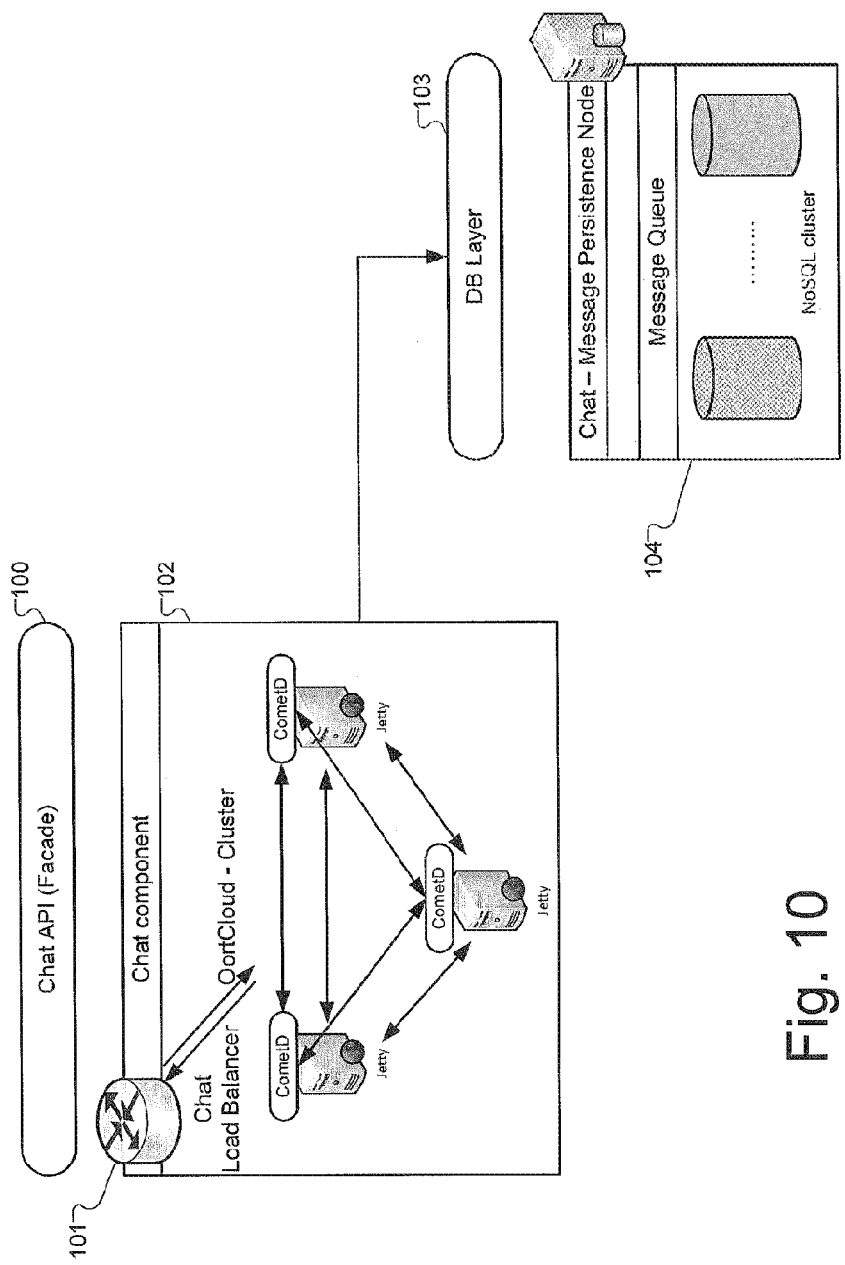
FIG. 10 is a block diagram of architecture of a system for managing user chat experiences with businesses in accordance with an embodiment of the present invention, showing in particular components that implement chat sessions as described herein.

FIG. 10 is a block diagram of architecture of a system for managing user chat experiences with businesses in accordance with an embodiment of the present invention, showing in particular components that implement chat sessions as described herein. There architecture here is similar to that described in connection with FIG. 9. The Chat component provides a commons chat interface for other components of the system through Chat API (Façade) 100. The chat logic 102 is implemented using a CometD event routing bus. Several CometD servers are grouped in OortCloud Cluster for load distribution, scalability and redundancy. Access to data storage for chat message archiving is performed through Database layer interface 103. Data is distributed across multiple clustered database servers 104 for load distribution, scalability and redundancy.

Figure 11:
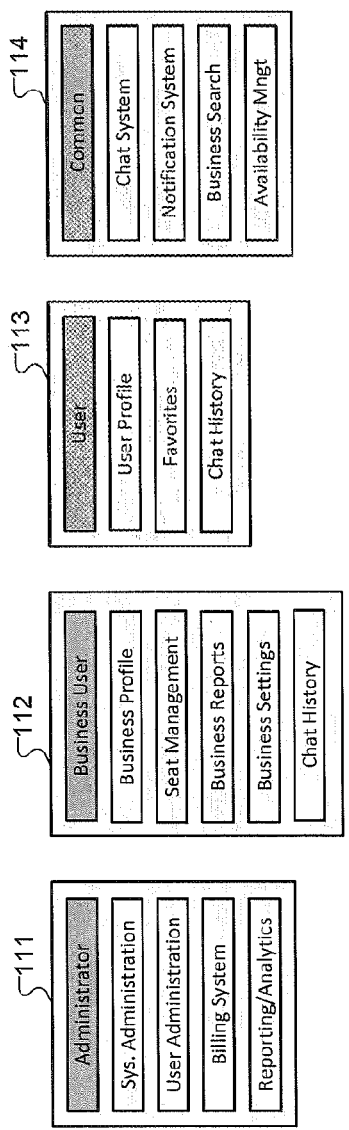
FIG. 11 is block diagram of software components employed in an embodiment of the present invention for managing user chat experiences with businesses.

FIG. 11 is block diagram of software components employed in an embodiment of the present invention for managing user chat experiences with businesses. Software components are grouped in four logical groups. Item 111 represents key software components for general management of the whole system, and includes system administration, internal user management, billing system and reporting system. Item 112 represents key software components that allow business users to manage their businesses, mainly for configuring business profile, managing seats, managing and viewing reports, configuring settings and viewing chat history. Item 113 represents key software components that allow users to manage profiles, favorites and viewing chat history. Item 114 represents key software components used by all users, such as chat system, notification system, search and availability management.

Figure 12:
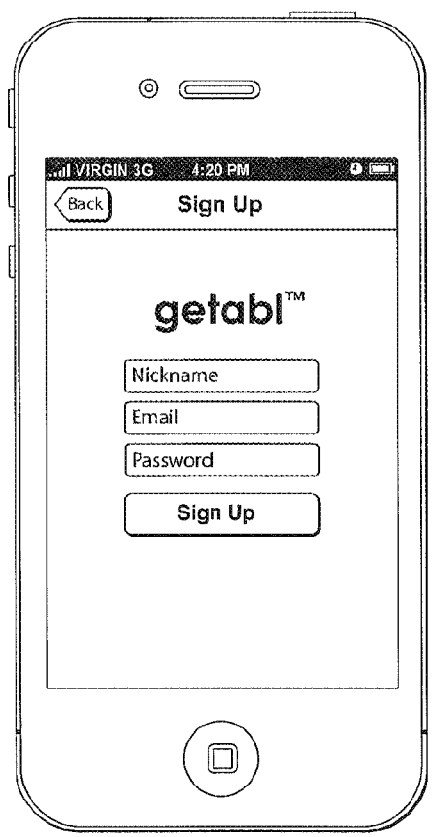
FIG. 12 is a representation of a screen presented to a user to sign up for an account with a system for managing user chat experiences with businesses in accordance with an embodiment of the present invention.

FIG. 12 is a representation of a screen presented to a user to sign up for an account with a system for managing user chat experiences with businesses in accordance with an embodiment of the present invention. The screen provides places for the user to provide a nickname, and e-mail address, and a password, and includes an icon that is selected to initiate sign-up. In this example, and in FIGS. 13-19, a screen of a smartphone is represented, but similar screens may be shown on a web browser of a desktop or laptop computer.

Figure 13:
FIG. 13 is a representation of a screen presented to an existing user to log in to the of FIG. 12.

FIG. 13 is a representation of a screen presented to an existing user to log in to the chat management server. The user supplies the user's e-mail address and password, and then selects the Login icon.

Figure 14:
FIG. 14 is a representation of a screen presented to the logged-in user of FIG. 13 by which to search for businesses that are available for a chat session.

FIG. 14 is a representation of a screen presented to the logged-in user of FIG. 13 by which to search for businesses that are available for a chat session.

Figure 15:
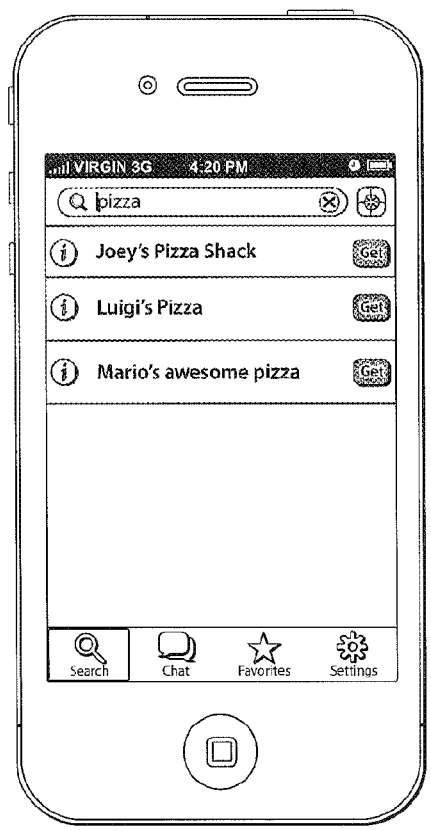
FIG. 15 is a representation of a screen presented to the user of FIG. 14 after conducting a search for "pizza"

FIG. 15 is a representation of a screen presented to the user of FIG. 14 after conducting a search for "pizza".

Figure 16:
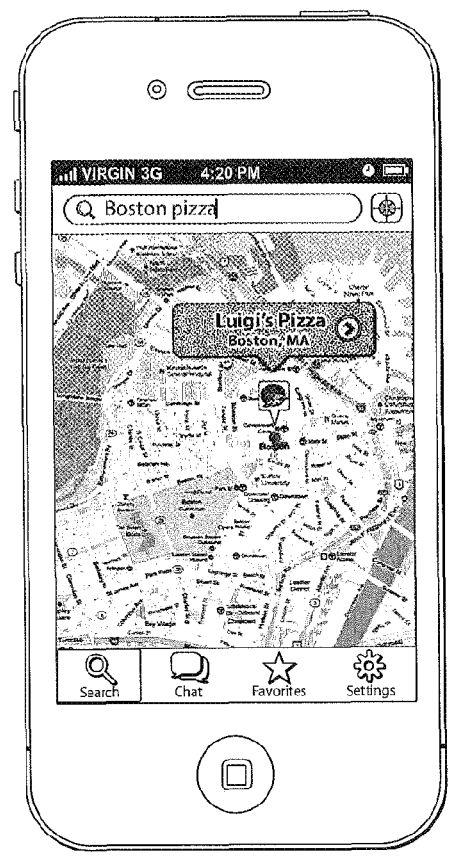
FIG. 16 is a representation of a screen presented to the user of FIG. 14 after conducting a search for "pizza" wherein the results are displayed on a map.

FIG. 16 is a representation of a screen presented to the user of FIG. 14 after conducting a search for "pizza" wherein the results are displayed on a map to show the user the locations of businesses identified by the search.

Figure 17:
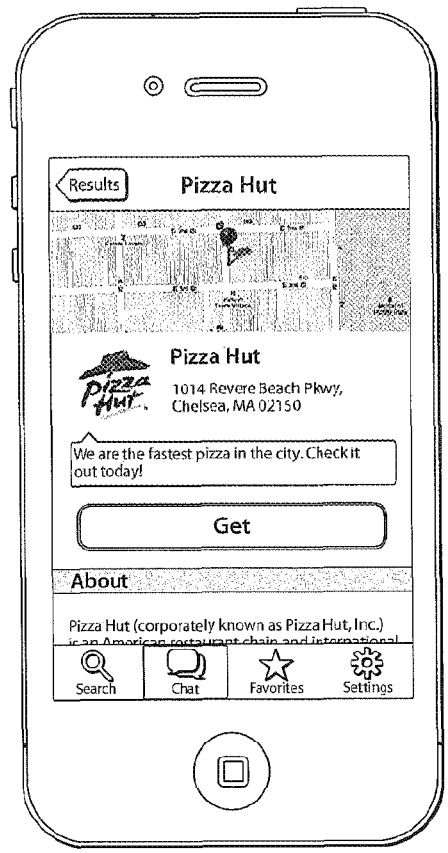
FIG. 17 is a representation [add launch-chat graphic] of a screen presented to the user of FIG. 16 after selecting the graphic identifying a particular pizza place appearing on the map of FIG. 16.

FIG. 17 is a representation of a screen presented to the user of FIG. 16 after selecting the graphic identifying a particular pizza place appearing on the map of FIG. 16. This screen provides detail about the business, including contact information and address. An icon is provided to add the business to Favorites of the user (for chat purposes). Another graphic may be provided by which the user may launch chat with the business.

Figure 18:
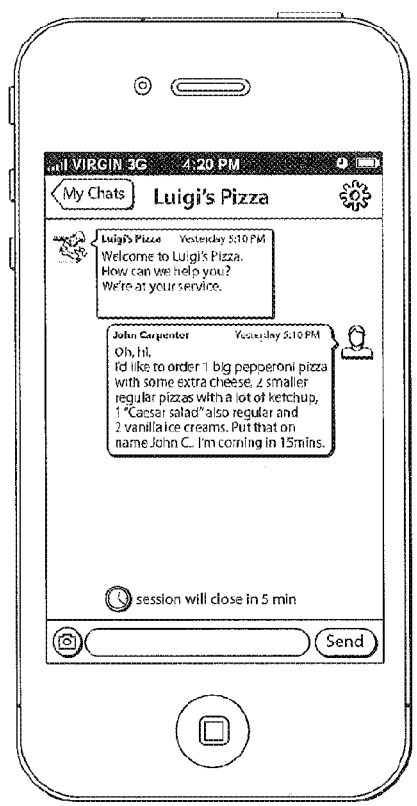
FIG. 18 is a representation of a screen presented to the user of FIG. 17 after selecting an option on the screen [to be added] to initiate a chat session.

FIG. 18 is a representation of a screen presented to the user of FIG. 17 after selecting an option on the screen of FIG. 17 to initiate a chat session. In the present screen, the user has entered text constituting the user's first outbound chat.

Figure 19:
FIG. 19 is a representation of a screen presented to the user of FIG. 14 by which to access "favorites"

FIG. 19 is a representation of a screen presented to the user of FIG. 14 in which are displayed graphics for businesses the user has saved as Favorites of the user for chat purposes.

Figure 20:
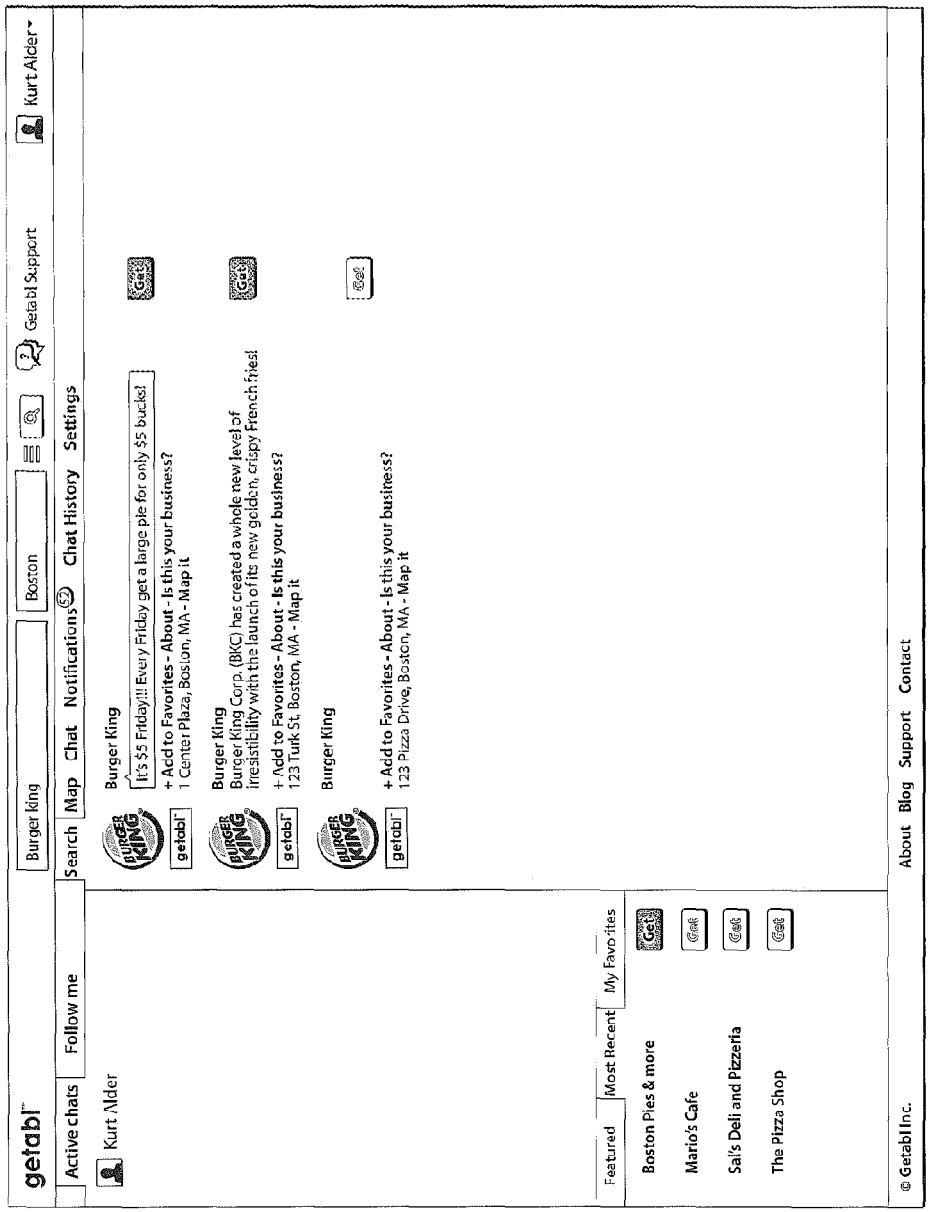
FIG. 20 is a representation of a computer screen displaying a web browser of presented to a logged-in user after running a search for "Burger king"

FIG. 20 is a representation of a computer screen displaying a web browser of presented to a logged-in user after running a search for "Burger king". (Although the examples of FIGS. 20 through 36 show computer screens displaying a web browser, similar screens can be accessed on a smartphone running a dedicated application or a suitable web browser.)

Figure 21:
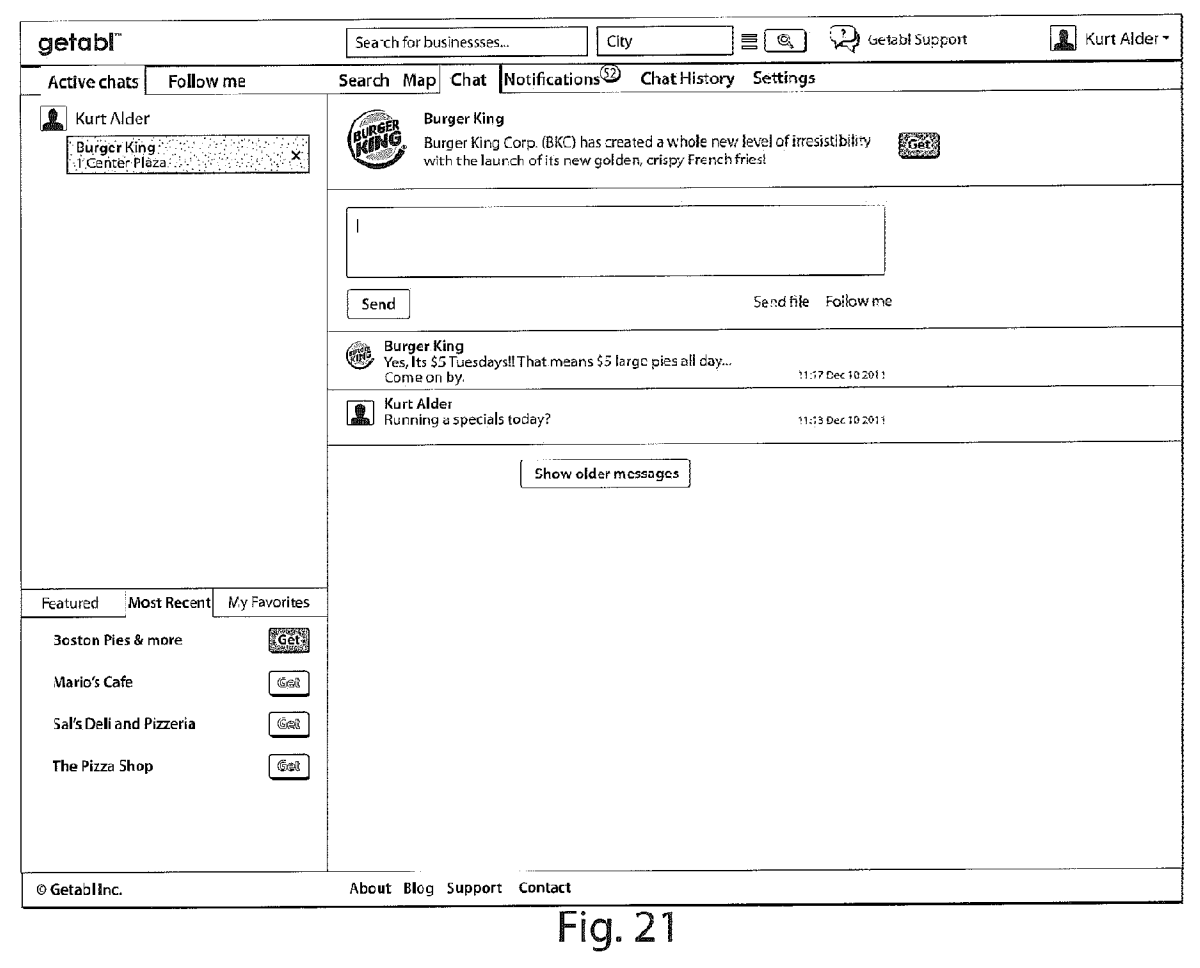

FIG. 21 is a representation of a computer screen (displaying a web browser) presented to the user of FIG. 20 who has selected to launch chat with one of the businesses identified in FIG. 20.

Figure 22:
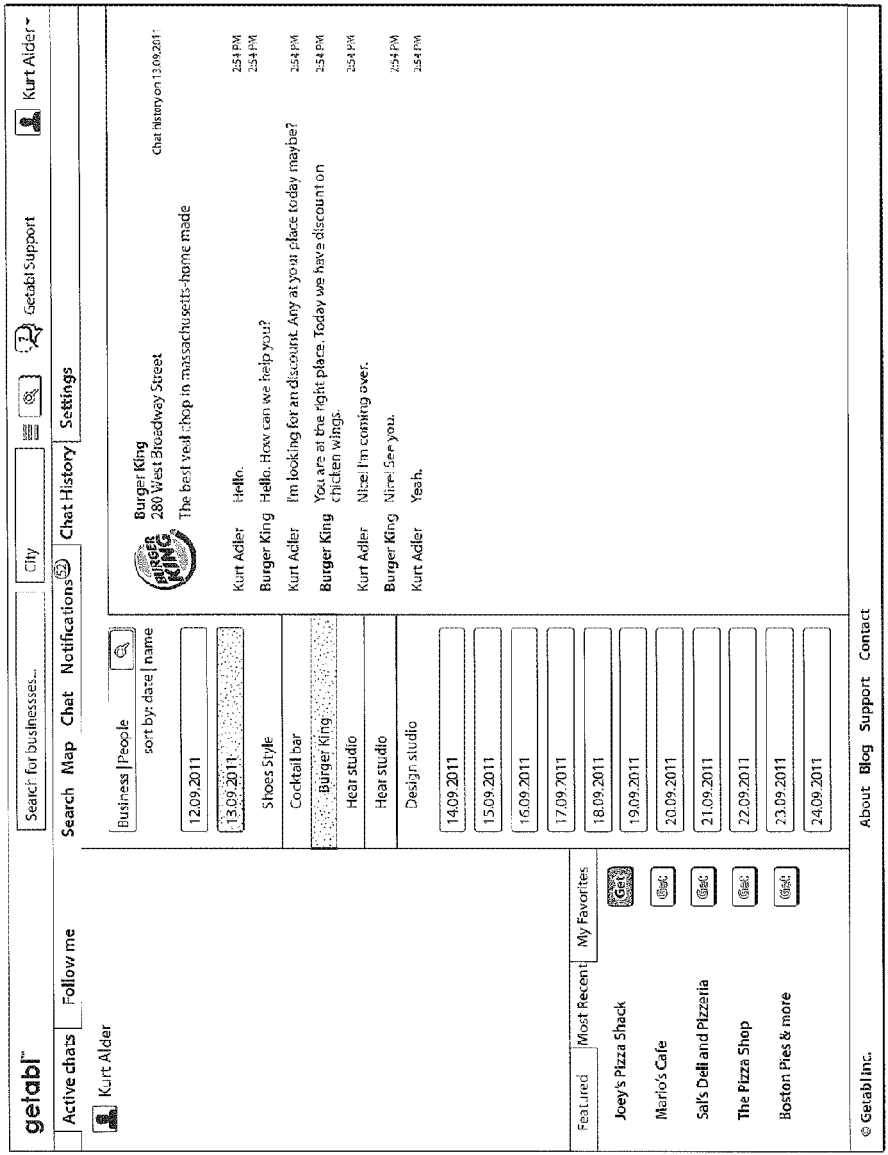
FIG. 22 is a representation of a computer screen presented to the user of FIGS. 20-21 showing the user's chat history with a selected business.

FIG. 22 is a representation of a computer screen presented to the user of FIGS. 20-21 showing the user's chat history with a selected business. Here on the left side of the screen the user has selected the chat history of Burger King on a particular date, and the chat pertinent to the selected business is displayed to right.

Figure 23:
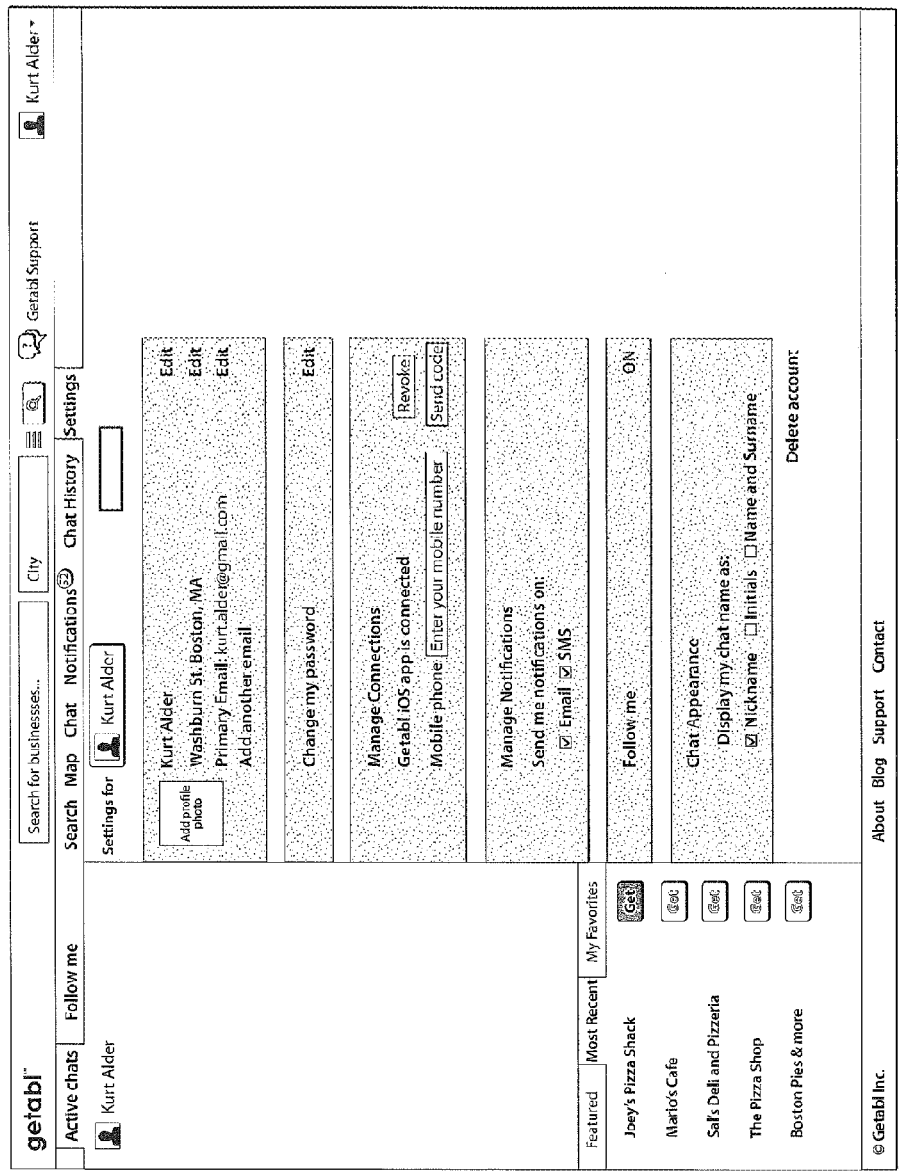
FIG. 23 is a representation of a computer screen presented to the user of FIGS. 20-22 showing the user's account settings.

FIG. 23 is a representation of a computer screen presented to the user of FIGS. 20-22 showing the user's account settings, including primary e-mail address, whether chat should also be replicated by e-mail and SMS messages, as well as other settings indicated in the figure.

Figure 24:
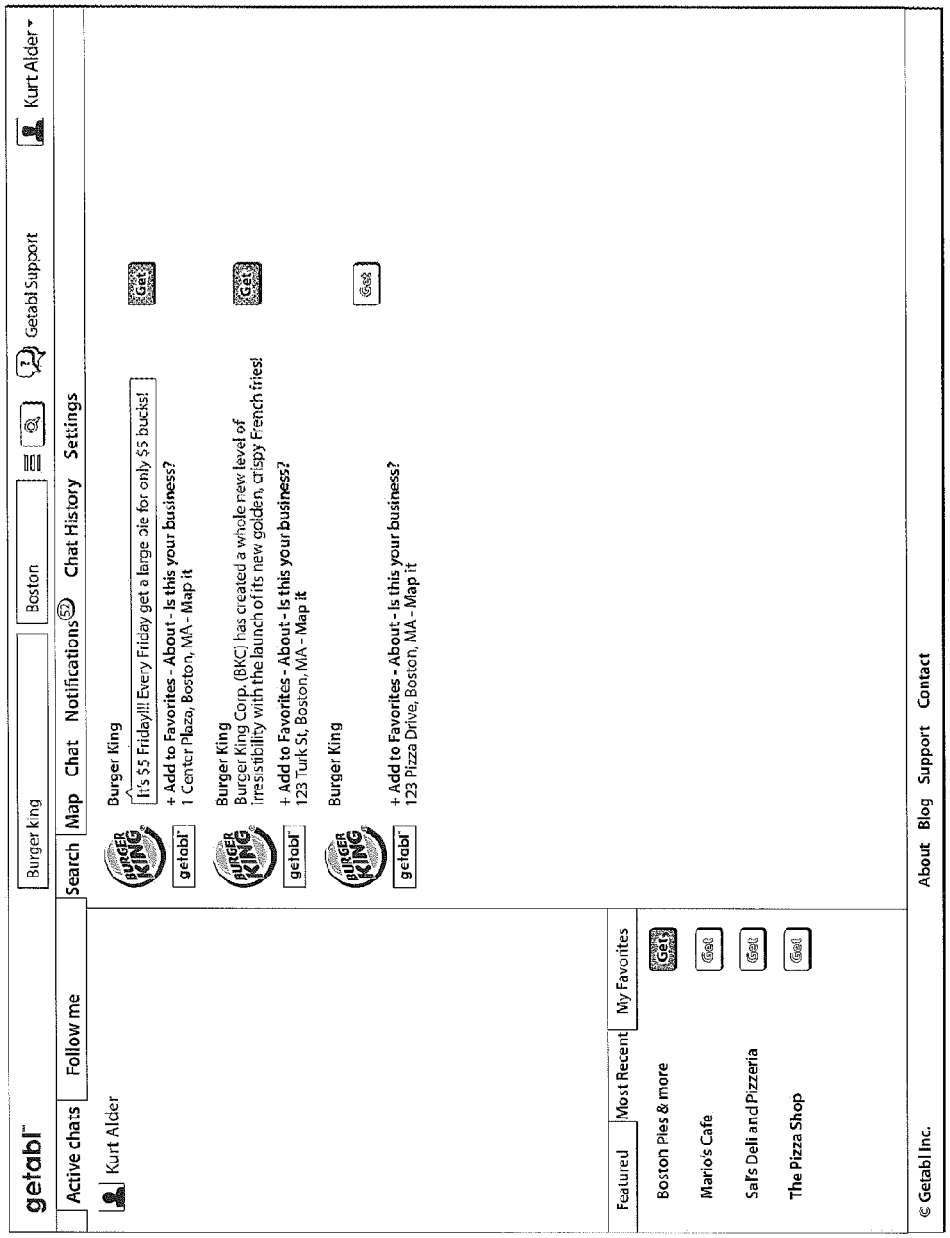
FIG. 24 is a representation of a computer screen displaying a wb browser presented to a logged-in business user after running a search for "Burger King"

FIG. 24 is a representation of a computer screen displaying a web browser presented to a logged-in business user after running a search for "Burger King". It can be seen in this figure that for each location identified for the business, there is a clickable link on the question "Is this your business?"

Figure 25:
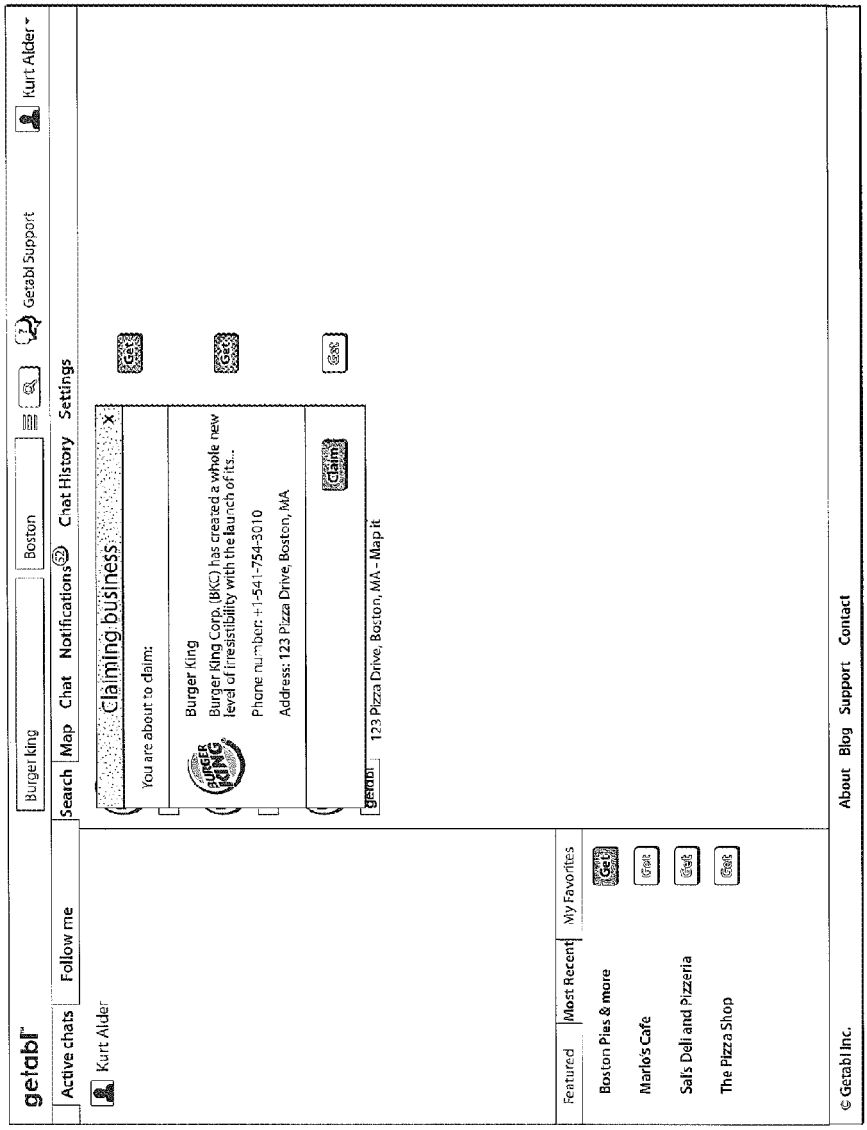
FIG. 25 is a representation of a computer screen presented to the business user of FIG. 24 who has made a selection to claim one of the businesses identified in FIG. 24.

FIG. 25 is a representation of a computer screen presented to the business user of FIG. 24 who has made a selection to claim one of the businesses identified in FIG. 24, by clicking on the on the question "Is this your business?" The result is the screen of this figure, where the location and contact information for the business are provided along with an icon that can be selected to claim the business.

Figure 26:
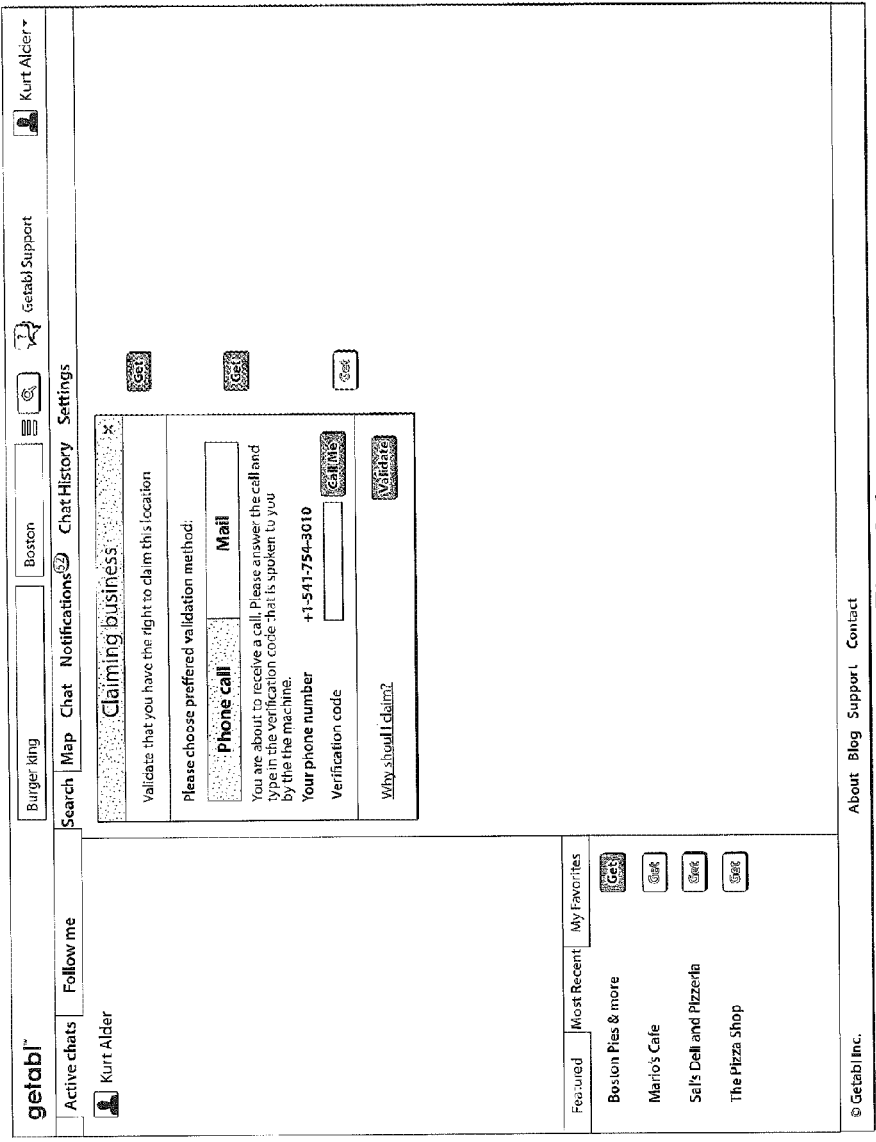
FIG. 26 is a representation of a computer screen presented to the business user of FIGS. 24-25 who has made a selection to claim the business by using the phone verification method.

FIG. 26 is a representation of a computer screen presented to the business user of FIGS. 24-25 who has made a selection to claim the business by using the phone verification method. In this embodiment, when an individual has claimed the business, the individual is given a choice of methods by which to validate the claim, and the choice made by the individual is shown here to include a phone call.

Figure 27:
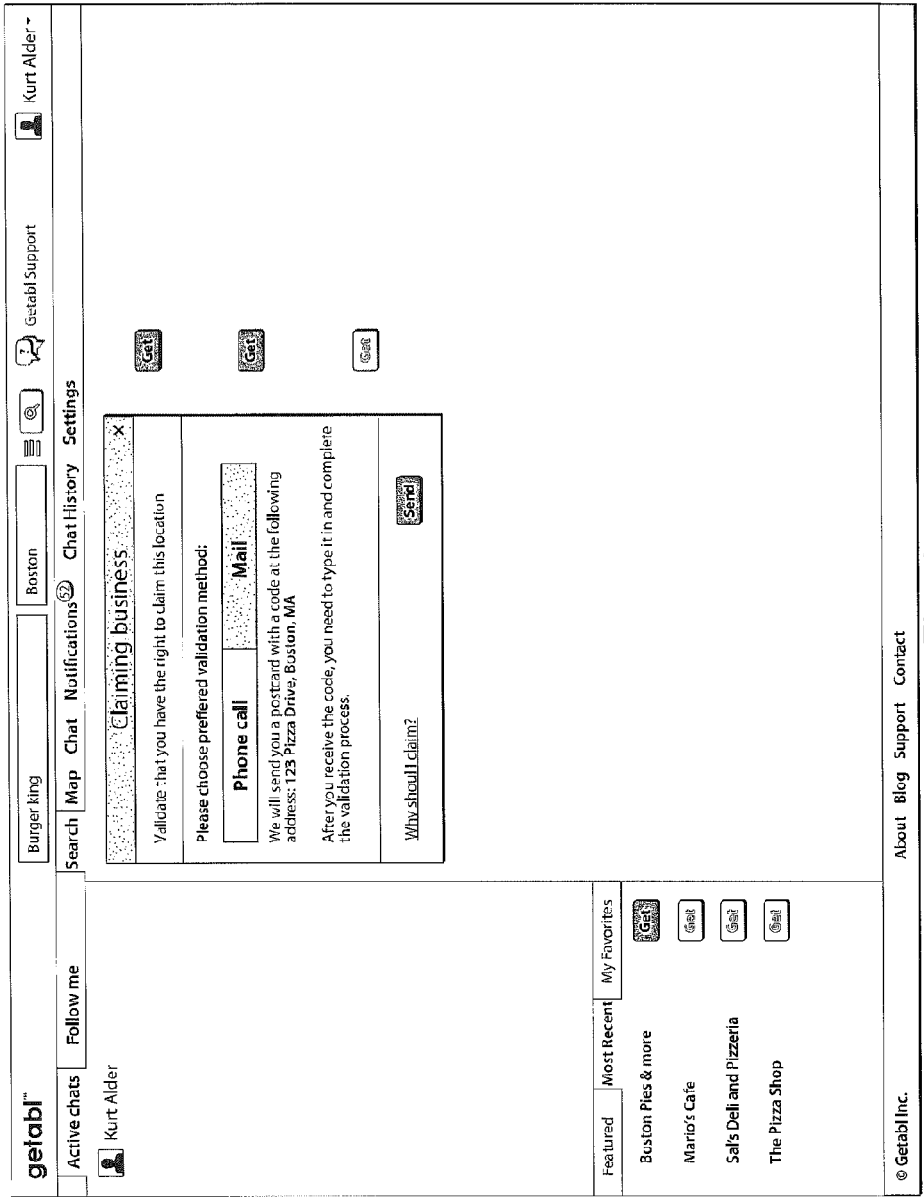
FIG. 27 is a representation of a computer screen presented to the business user of FIGS. 24-25 who has made a selection to claim the business by using the mail verification method.

FIG. 27 is a representation of a computer screen presented to the business user of FIGS. 24-25 who has made a selection to claim the business by using the mail verification method. This screen is similar to that of FIG. 26, except that the business user has selected mail verification.

Figure 28:
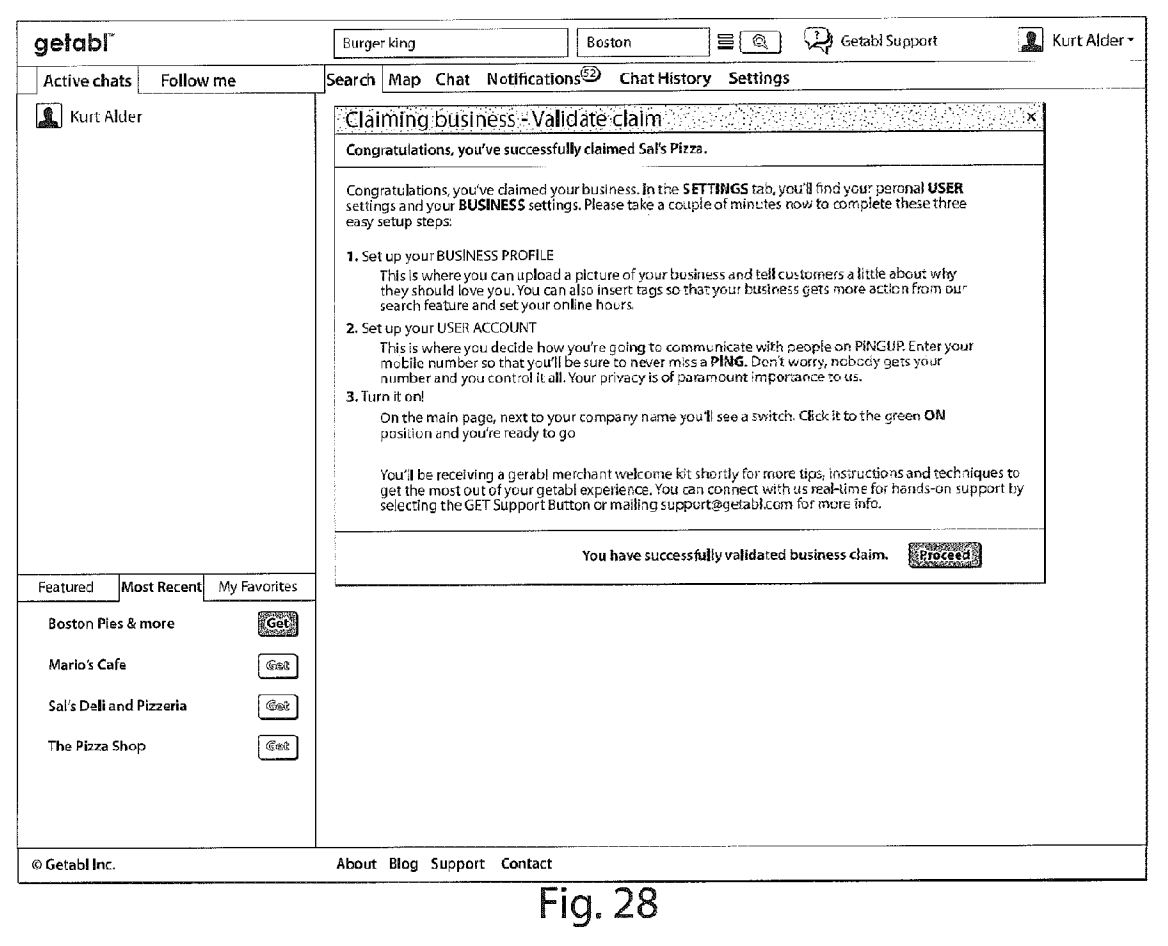

FIG. 28 is a representation of a computer screen presented to the business user of FIGS. 24-27 after completing a validation process.

Figure 29:
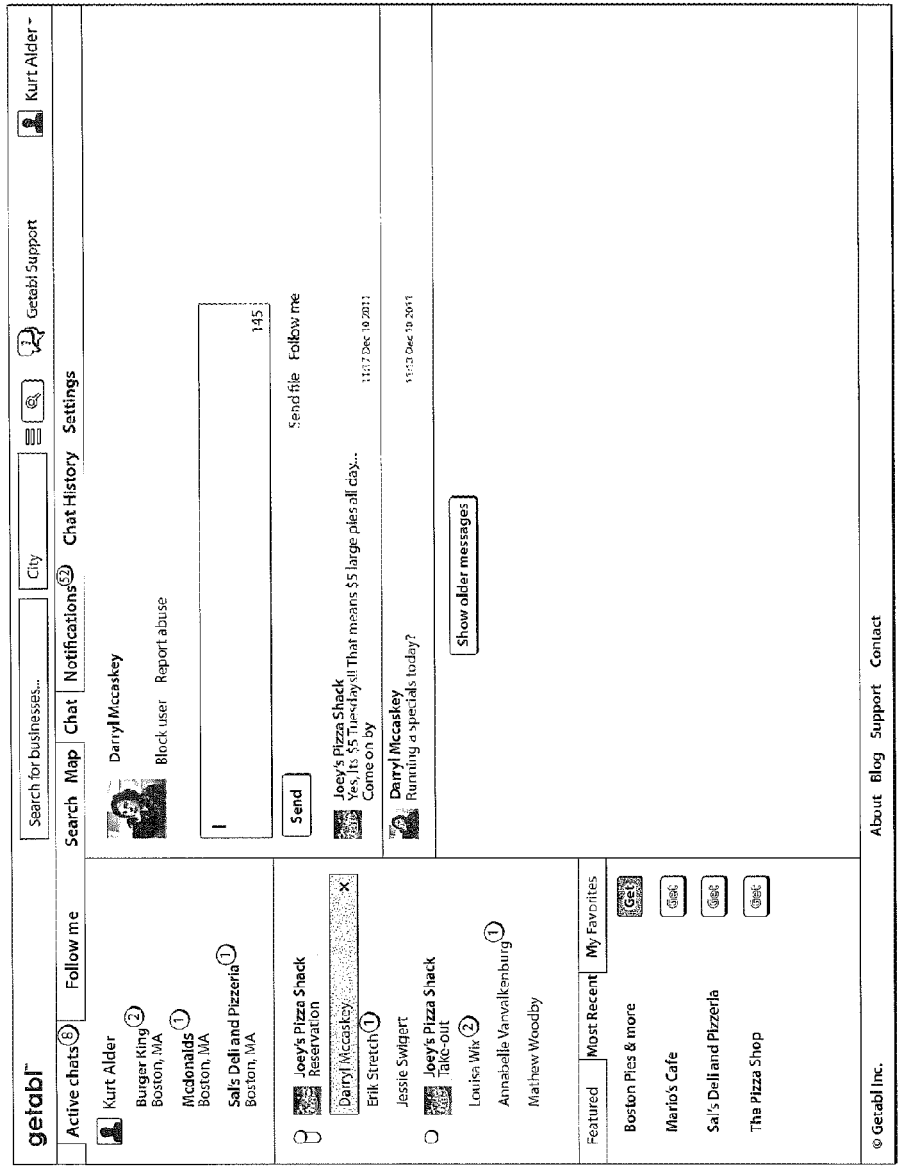
FIG. 29 is a representation of a computer screen presented to the business user of FIGS. 24-28 who has received one or more chat requests from other users.

FIG. 29 is a representation of a computer screen presented to a business user, shown here as Joey's Pizza Shack, who is engaged in chat with a user.

Figure 30:
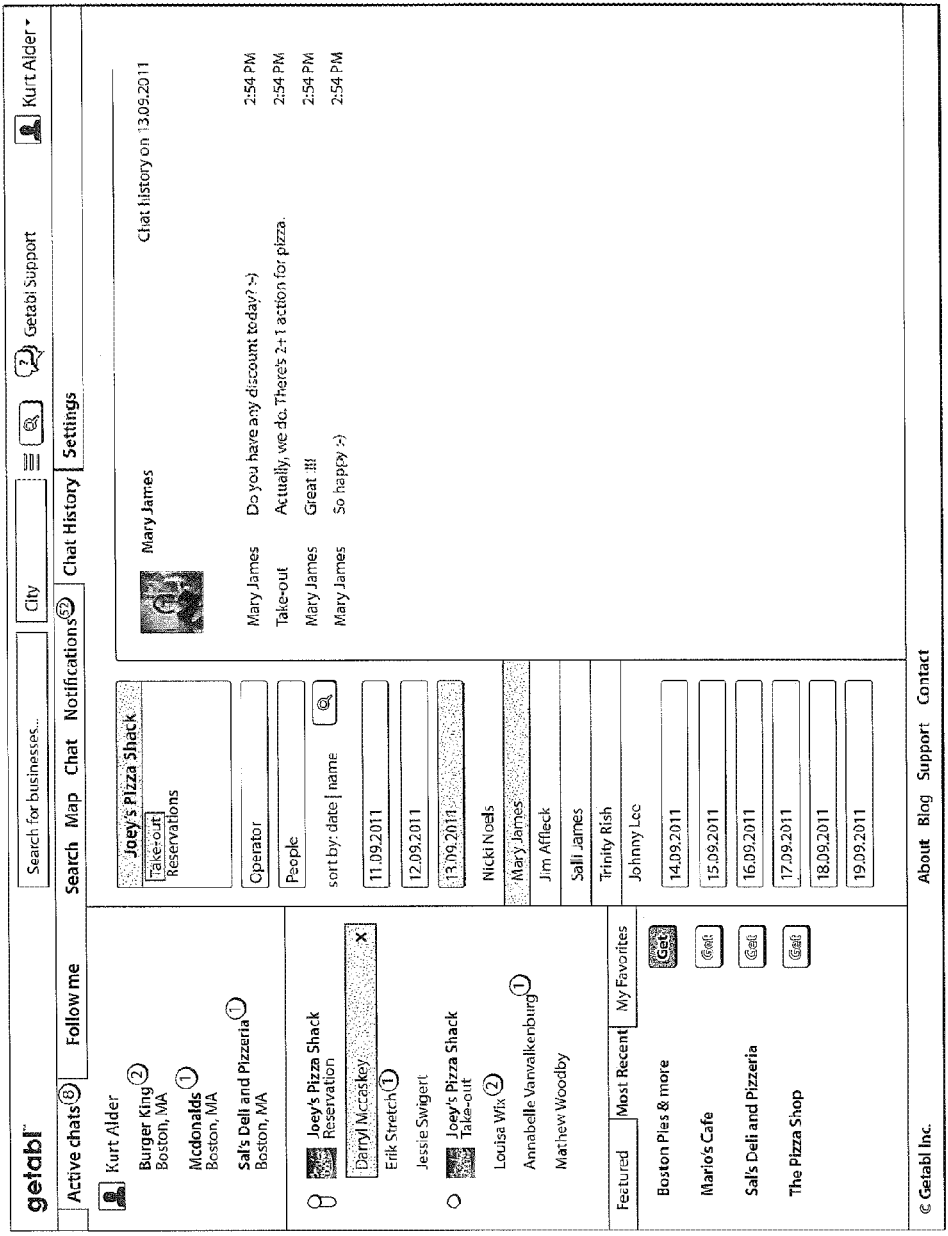
FIG. 30 is a representation of a computer screen presented to the business user of FIGS. 24-29 showing the user's chat history with a selected user.

FIG. 30 is a representation of a computer screen presented to the business user of FIGS. 24-29 showing the user's chat history with a selected user. Here in the second column of the screen the user has selected chat history on a particular date with a particular user, and the chat for the selected user and the selected date is shown in the third column of the screen.

Figure 31:
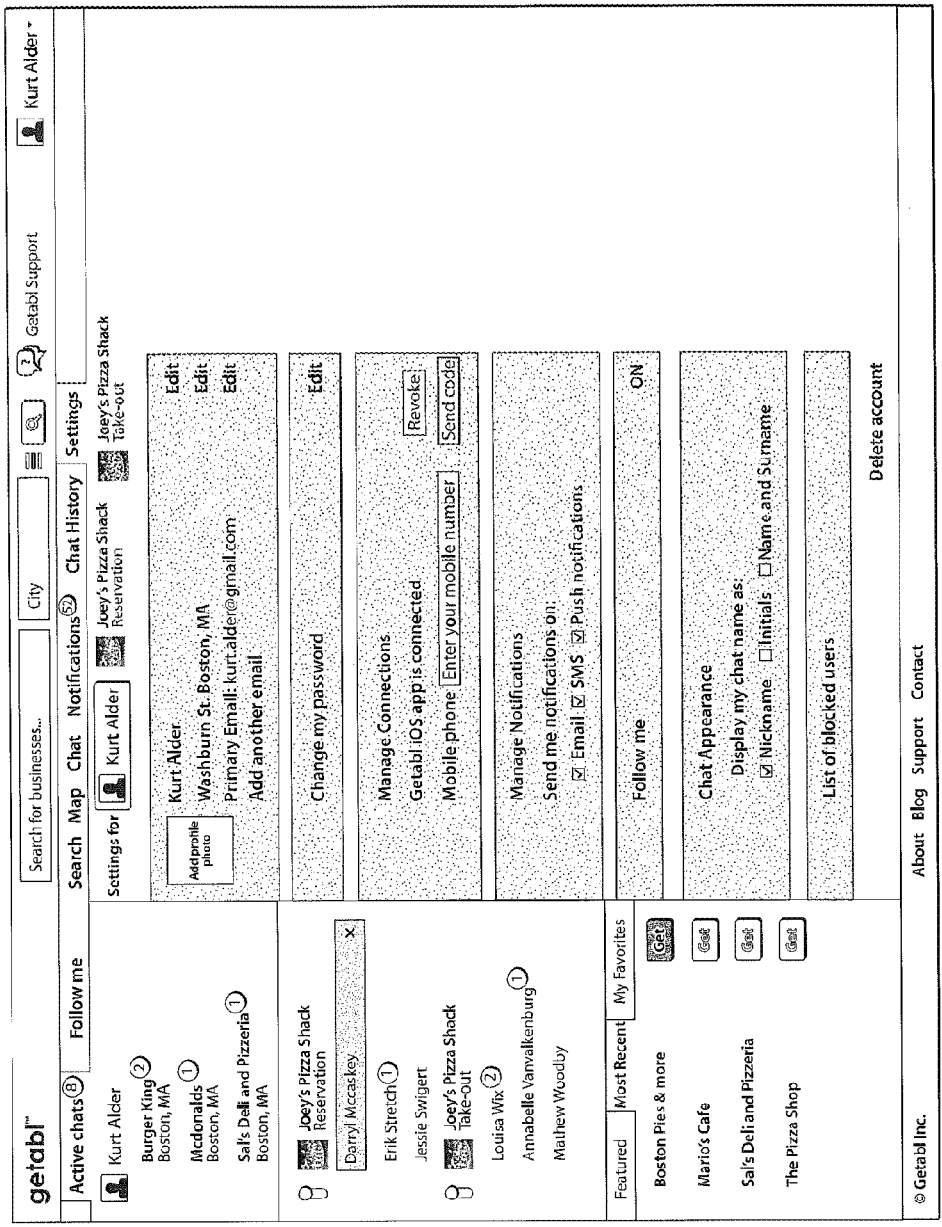
FIG. 31 is a representation of a computer screen presented to the business user of FIGS. 24-30 showing the user's account settings.

FIG. 31 is a representation of a computer screen presented to the business user of FIGS. 24-30 showing the user's account settings, as to forwarding of chat via e-mail and SMS, use of nickname, etc.

Figure 32A:
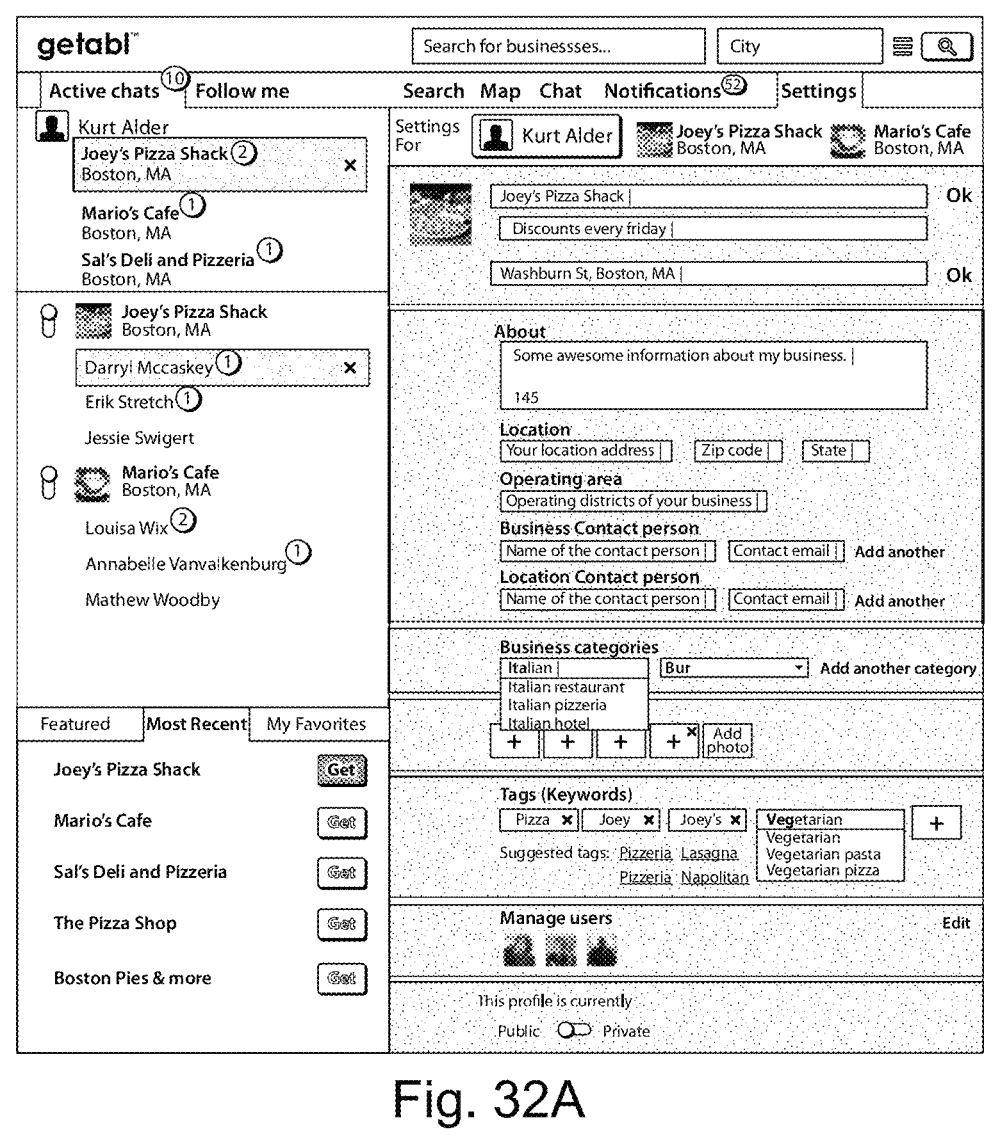
Figure 32B:
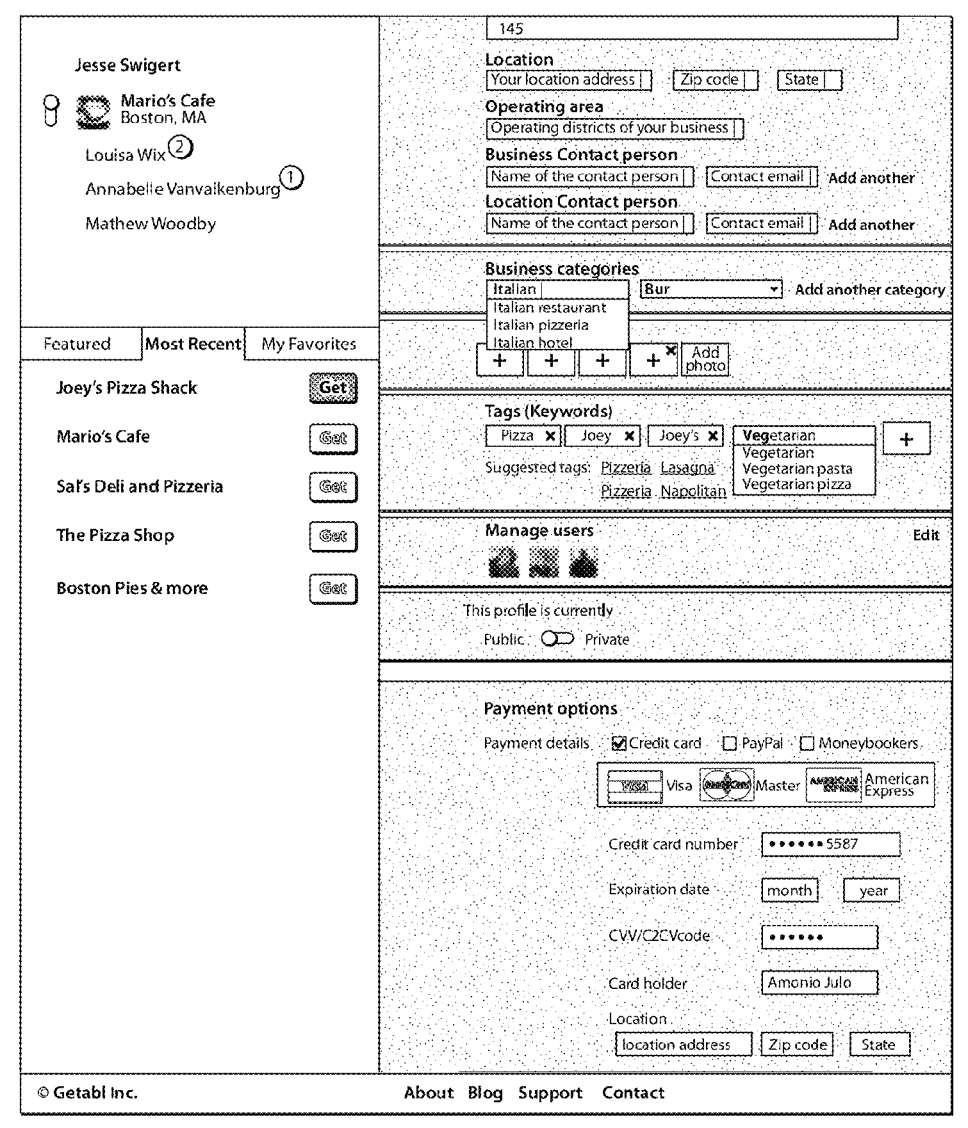

FIGS. 32A-32B are representations of first and second parts of a computer screen presented to the business user of FIGS. 24-31 showing the user's business settings. The screen is too large to reproduce in a single figure, but includes credit card payment arrangements, provision for adding seats to the account, keywords that in a user's search that would trigger a listing of the business, business locations, business categories, and business users affiliated with the business.

Figure 33:
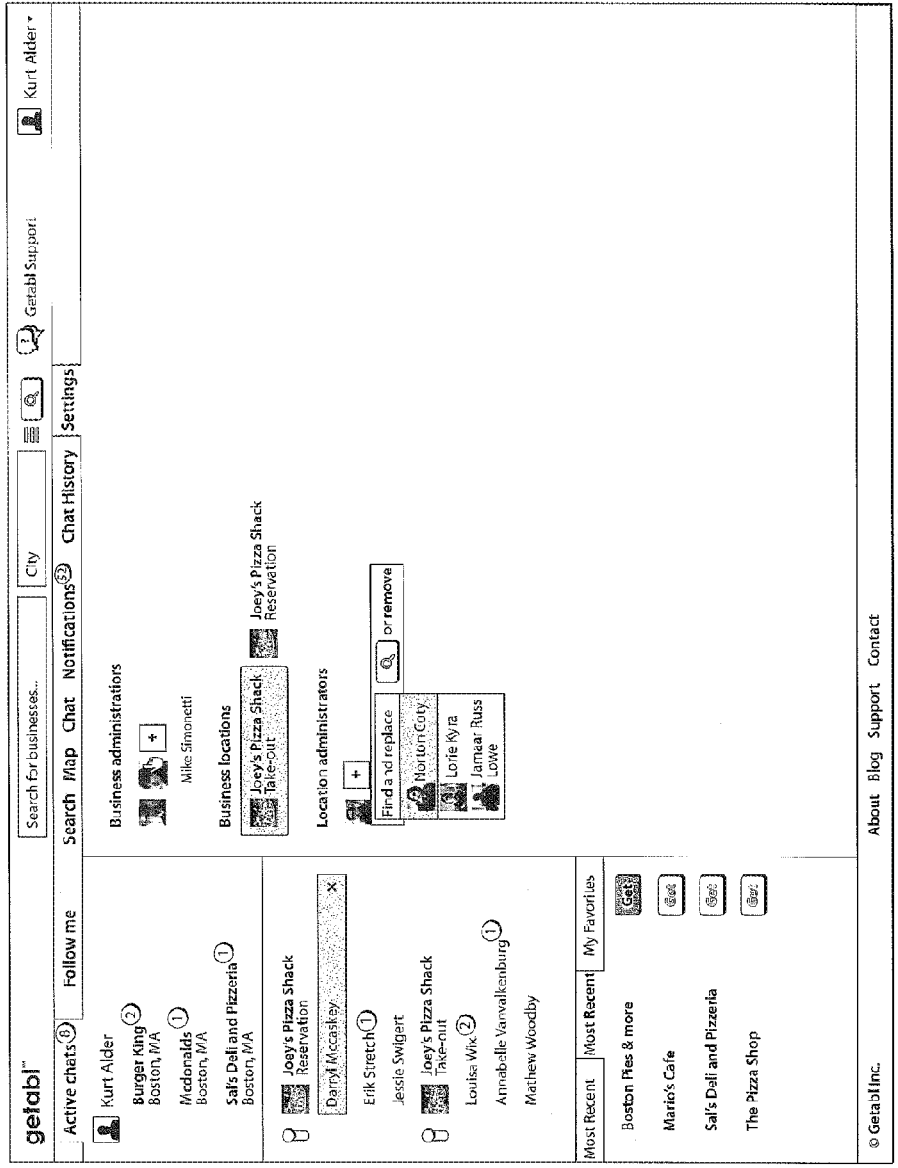
FIG. 33 is a representation of a computer screen presented to the business user of FIGS. 24-32 showing the user's business settings for managing business locations and locations administrators.

FIG. 33 is a representation of a computer screen presented to the business user of FIGS. 24-32 showing the user's business settings for managing business locations and locations administrators.

Figure 34:
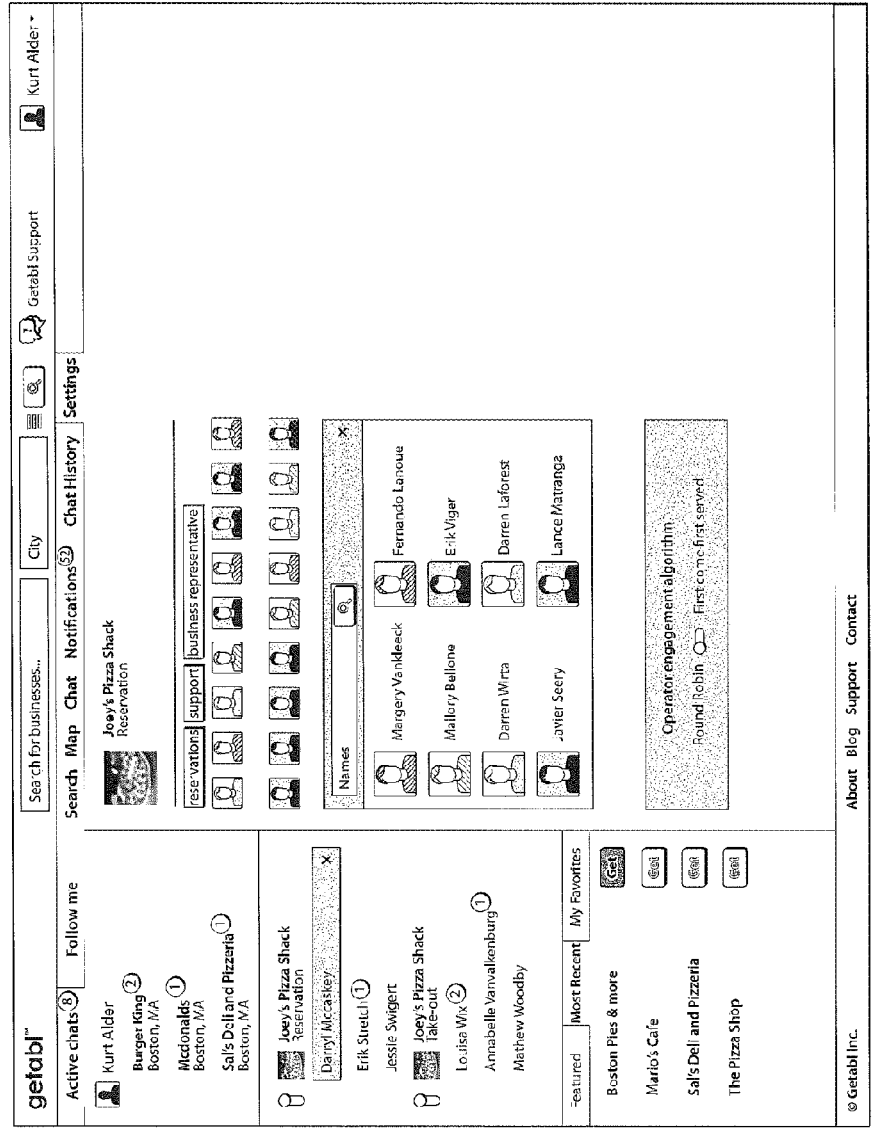
FIG. 34 is a representation of a computer screen presented to the business user of FIGS. 24-33 showing the user's business settings for managing business seats, seats types and routing settings.

FIG. 34 is a representation of a computer screen presented to the business user of FIGS. 24-33 showing the user's business settings for managing business seats, seats types and routing settings. The first third of the screen shows allocation of seat types. The types here have been designated by the business as "reservations", "support", and "business representative". Each type is given a color and business users for this business have been assigned seat types indicated by the color. The middle third of the screen lists business users available for seat assignments. The bottom third of the screen lets the business user select whether seat operators are assigned chat based on a round-robin or first come, first served basis.

Figure 35:
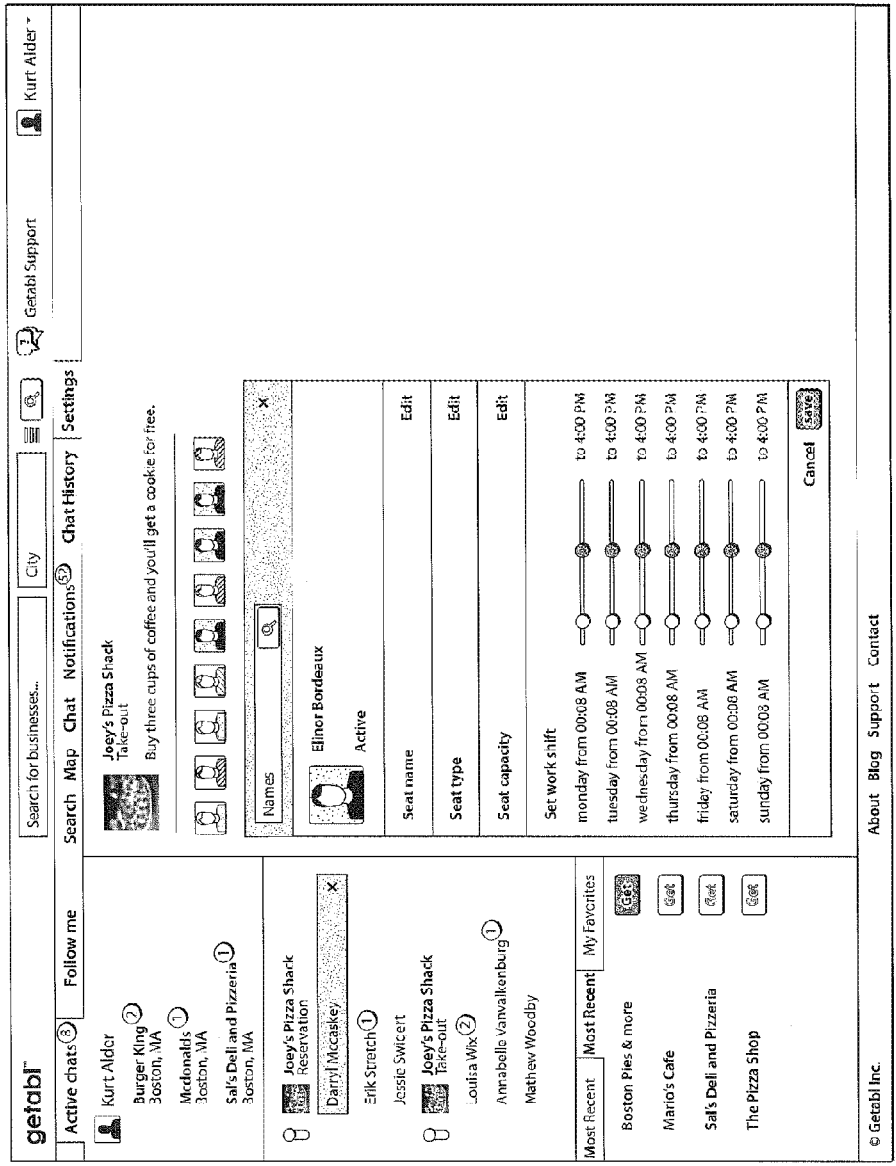
FIG. 35 is a representation of a computer screen presented to the business user of FIGS. 24-34 showing the user's business settings for managing a specific business seat, including shifts/availability.

FIG. 35 is a representation of a computer screen presented to the business user of FIGS. 24-34 showing the user's business settings for managing a specific business seat, including shifts/availability.

Figure 36:
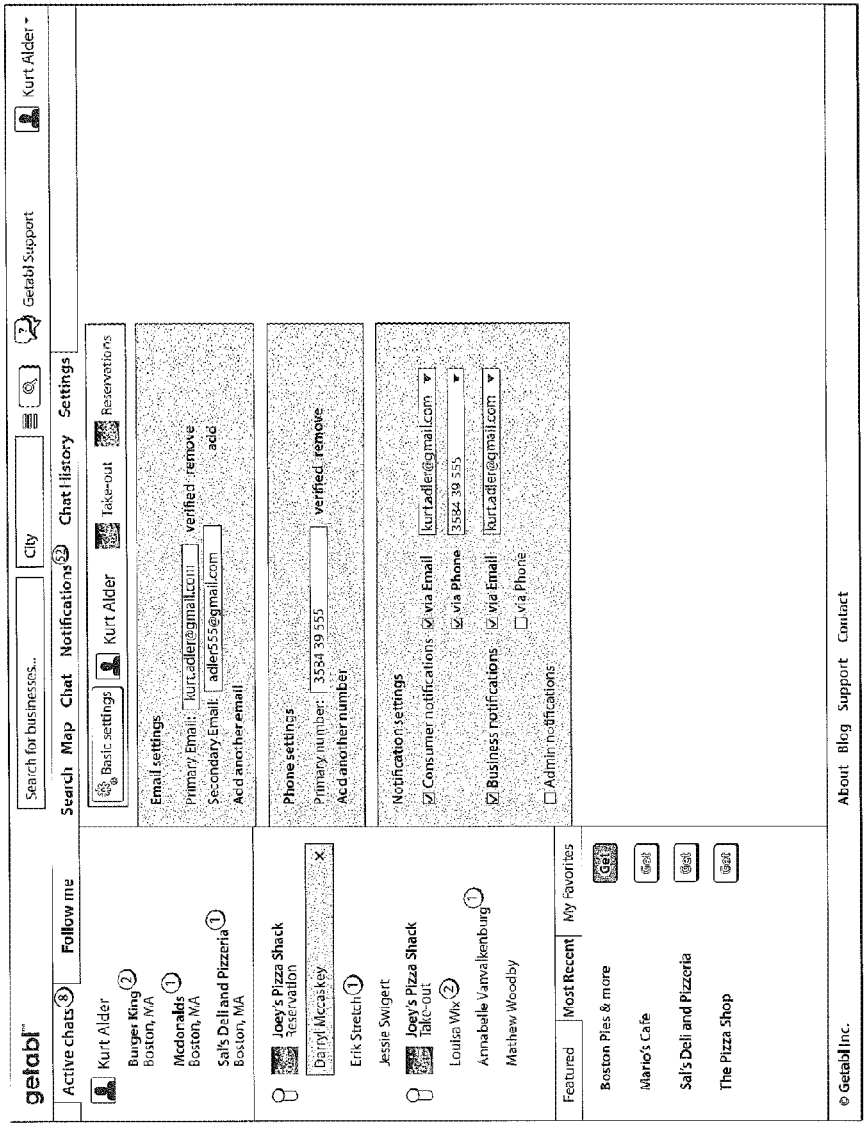
FIG. 36 is a representation of a computer screen presented to the business user of FIGS. 24-34 showing notification settings. Here the business user has selected to have consumer chat forwarded by e-mail and SMS (therein called "Phone").

FIG. 36 is a representation of a computer screen presented to the business user of FIGS. 24-34 showing notification settings. Here the business user has selected to have consumer chat forwarded by e-mail and SMS (therein called "Phone").

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of managing a chat experience of a user desiring to chat with a selected one of a plurality of businesses, the method utilizing a chat management server running computer processes comprising:
   receiving a search signal over a first network from a device, under control of the user, to indicate that the user device is running a process configured to support a managed chat session and including data characterizing criteria for a business with which the user seeks to chat;
   responsive to the search signal, identifying a set of businesses meeting the criteria, determining availability status data for each business in the set of businesses, and transmitting, to the device, availability status data for the set of businesses for display on the user's device;
   receiving over the first network a request message originated by the user on the device to enter a chat channel established for a selected one of the set of businesses;
   responsive to the request message, subscribing the user device to the chat channel for the selected one of the set of businesses, and transmitting to the device, over the first network, a launch-chat command; and
   running an installed application of the selected business, in accordance with business rules specified by the selected business, after the user has been subscribed to the chat channel.

2. A method according to claim 1, the computer processes further comprising associating a duration for the channel, and if the chat channel has not been previously closed by a party to the chat, then closing the chat channel effective as of the end of the duration.

3. A method according to claim 2, wherein the duration is established according to a user-specified default.

4. A method according to claim 1, wherein the request message originated by the user on the device to enter the chat channel has been issued responsive to a user selection, made graphically on a display of the device, of the set of businesses.

5. A method according to claim 4, wherein the data characterizing criteria for a business with which the user seeks to chat have resulted from a search initiated by the user.

6. A method according to claim 5, wherein the search has resulted by user selection of one of a set of pre-defined categories.

7. A method according to claim 4, wherein the data characterizing criteria for a business with which the user seeks to chat have resulted from selection by the user to cause display of favorites saved by the user.

8. A method according to claim 4, wherein the data characterizing criteria for a business with which the user seeks to chat have resulted from selection by the user to cause display of businesses recently accessed by the user for purposes of chat.

9. A method according to claim 1, the computer processes further comprising, responsive to the request message, determining a pattern, for the chat channel, for message routing to seats of the selected business based on availability status data for the selected business and business rules provided by the selected business.

10. A method according to claim 9, wherein the pattern includes routing all messages from the user to the same seat.

11. A method according to claim 9, wherein the pattern includes routing successive messages from the user to the next available seat that is not busy.

12. A method according to claim 9, wherein the pattern includes routing all messages from the user to a plurality of seats simultaneously.

13. A method according to claim 9, wherein (i) business rules provided by the selected business specify a plurality of seat types, (ii) the availability data includes information enabling a user to make a selection corresponding to a specific seat type, (iii) the request message includes data indicative of the seat type corresponding to the selection made by the user, and (iv) subscribing the user device to the chat channel includes subscribing the user device in a manner consistent with the specific seat type.

14. A method according to claim 9, the computer processes further comprising:
receiving from a business user, in one of the seats, of the selected business, that is subscribed to the chat channel, a transfer request message to transfer the user to chat with a different seat of the selected business; and
responsive to the transfer request message, transferring the user device to chat with the different seat of the selected business.

15. A method according to claim 9, the computer processes further comprising:
receiving from a business user, in one of the seats, of the selected business, that is subscribed to the chat channel, a join request message to add to the chat channel at least one additional business user from the selected business; and
responsive to the join request message, subscribing to the chat channel the at least one additional business user.

16. A method according to claim 1, the computer processes further comprising:
receiving, in the search signal, data indicating an approximate location of the device and transmitting availability data includes transmitting availability data for businesses based, at least in part, on the approximate location.

17. A method according to claim 1, the computer processes further comprising:
storing chat content of the chat channel and archiving the content in a chat database in association with an identifier for the selected business and for the user.

18. A method according to claim 17, the computer processes further comprising storing, in the chat database, chat metadata with the chat content.

19. A method according to claim 17, the computer processes further comprising storing, in the chat database, data relating to an unsuccessful attempt by the user to initiate chat with one of the plurality of businesses.

20. A method according to claim 19, the computer processes further comprising:

running a computerized analysis of the chat database, to identify chat performance measurements, for any given business, including at least one of: (a) what fraction of user requests to chat were followed by a response; (b) average time to first response per request; (c) average time to response, after the first response, per request; (d) average number of responses provided in a given chat session; and (e) what percentage of chat responses were made within a specified period of time.

21. A method according to claim 1, wherein identifying the set of businesses meeting the criteria includes determining from stored data whether the user is authorized by any given business meeting the criteria, and if so including the given business in the set of businesses and otherwise excluding the given business from the set of businesses.

22. A method according to claim 1, the computer processes further comprising, prior to subscribing the user device to the chat channel for the selected one of the set of businesses, determining whether the selected one of the set of businesses requires further authorization by the business to enable the user to chat, and, if so, (i) transmitting to the device, over the first network, data establishing a form to be displayed on the device, configured to receive user-supplied information establishing entitlement of the user to chat, (ii) receiving from the device such information, (iii) processing such information, and only if authorization is determined as a result of such information, allowing the subscribing of the user device to the chat channel.

23. A method according to claim 1, the computer processes further comprising prior to receiving a search signal, receiving over the first network from the user's device a request and credentials for authentication of the user, determining if the credentials are valid, and if so, logging in the user device.

24. A method according claim 23, wherein the user has at least one additional device, the method further comprising:
receiving over a second network from the at least one additional device a further request and further credentials for authentication of the user, determining if the further credentials are valid, and if so, logging in the at least one additional user device; and
subscribing the at least one additional device to the chat channel.

25. A method according to claim 23, the computer processes further comprising:
repeating each of the foregoing processes at least once so as to subscribe the user device to at least one additional chat channel for another business selected by the user, so that the user device may be simultaneously subscribed to a plurality of chat channels.

26. A method according claim 25, wherein the user has at least one additional device, the method further comprising:
receiving over a second network from the at least one additional device a further request and further credentials for authentication of the user, determining if the further credentials are valid, and if so, logging in the at least one additional user device; and
subscribing the at least one additional device to the plurality of chat channels.

27. A method according to claim 1, the computer processes further comprising:
receiving a forward-chat message from the user over the first network;
responsive to the forward-chat message, forwarding to the user at a secondary electronic destination, in accordance with user-established settings, chat messages addressed to the user from the selected one of the set of businesses and forwarding to the selected one of the set of businesses each message from the user originating from the secondary electronic destination in response to a forwarded message from the selected one of the set of businesses.

28. A method according to claim 27, wherein the user-established settings specify forwarding to occur at all times when forwarding is in effect.

29. A method according to claim 27, wherein the user-established settings specify forwarding to occur only when the user device is not in communication with the server.

30. A method according to claim 1, the computer processes further comprising, upon subscribing the user device to the chat channel, identifying the user in accordance with criteria established by the user.

31. A method according to claim 30, wherein the criteria are global and apply to all businesses with which the user engages in chat.

32. A method according to claim 30, wherein the criteria are specified by the user as applicable to the selected one of the businesses.

33. A method according to claim 1, wherein running the installed application occurs automatically immediately after the user has been subscribed to the chat channel.

34. A method according to claim 1, wherein running the installed application occurs when a business user of the selected business manually invokes the installed application.

35. A method according to claim 1, wherein running the installed application occurs when triggered automatically by a response by the user in the course of chat.

36. A computer-implemented method of managing a chat experience of a business user desiring to chat with a selected one of a plurality of other users, the method utilizing a chat management server running computer processes comprising:
receiving a search signal over a first network from a device, under control of the business user, to indicate that the user device is running a process configured to support a managed chat session and including data characterizing criteria for another user with whom the business user seeks to chat;
responsive to the search signal, identifying a set of users meeting the criteria, and for each user in the set of users, determining availability status, and transmitting, to the device, availability status data for the set of users for display on the business user's device;
receiving over the first network a request message originated by the business user on the device to enter a chat channel established for a selected one of the set of users;
responsive to the request message, subscribing the user device to the chat channel for the selected one of the set of users, and transmitting to the device, over the first network, a launch-chat command; and
running an installed application of the selected business, in accordance with business rules specified by the selected business, after the user has been subscribed to the chat channel.

37. A method according to claim 36, wherein identifying the set of users meeting the criteria includes excluding from the set any user who has not authorized receiving chat from the business of the business user, so that such user is not displayed on the business user's device.

38. A method according to claim 36, of managing a chat experience of a given business user desiring to chat with a selected one of a plurality of other business users in the same business as the given business user, wherein the set of users corresponds to at least some of other business users in the same business.

39. A method according to claim 36, wherein the data characterizing criteria for another user with whom the business user seeks to chat have resulted from a search initiated by the business user.

40. A method according to claim 36, wherein the search has resulted by business user selection of one of a set of pre-defined categories.

41. A method according to claim 36, wherein the data characterizing criteria for a another user with whom the business user seeks to chat have resulted from selection by the business user to cause display of favorites saved by the business user.

42. A method according to claim 36, wherein the data characterizing criteria for a another user with whom the business user seeks to chat have resulted from selection by the business user to cause display of users recently accessed by the business user for purposes of chat.

43. A method according to claim 36, the computer processes further comprising associating a duration for the channel, and if the chat channel has not been previously closed by a party to the chat, then closing the chat channel effective as of the end of the duration.

44. A method according to claim 36, the computer processes further comprising prior to receiving a search signal, receiving over the first network from the business user's device a request and credentials for authentication of the business user, determining if the credentials are valid, and if so, logging in the business user device.

45. A method according claim 44, wherein the business user has at least one additional device, the method further comprising:
receiving over a second network from the at least one additional device a further request and further credentials for authentication of the business user, determining if the further credentials are valid, and if so, logging in the at least one additional device; and
subscribing the at least one additional device to the chat channel.

46. A method according to claim 44, the computer processes further comprising:
repeating each of the foregoing processes at least once so as to subscribe the business user device to at least one additional chat channel for another user selected by the business user, so that the business user device may be simultaneously subscribed to a plurality of chat channels.

47. A method according claim 46, wherein the user has at least one additional device, the method further comprising:
receiving over a second network from the at least one additional device a further request and further credentials for authentication of the business user, determining if the further credentials are valid, and if so, logging in the at least one additional business user device; and
subscribing the at least one additional device to the plurality of chat channels.

* * * * *